(12) United States Patent
Inoue et al.

(10) Patent No.: US 8,487,953 B2
(45) Date of Patent: Jul. 16, 2013

(54) IMAGE SIGNAL CONVERTING APPARATUS AND IMAGE DISPLAY APPARATUS

(75) Inventors: Masutaka Inoue, Hirakata (JP); Susumu Tanase, Kadoma (JP); Takaaki Abe, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 743 days.

(21) Appl. No.: 12/243,372

(22) Filed: Oct. 1, 2008

(65) Prior Publication Data

US 2009/0096806 A1    Apr. 16, 2009

(30) Foreign Application Priority Data

Oct. 1, 2007 (JP) ................................. P2007-258087

(51) Int. Cl.
*G09G 5/02* (2006.01)
(52) U.S. Cl.
USPC .......................................................... 345/591
(58) Field of Classification Search
USPC ............................................ 345/31, 603, 76
See application file for complete search history.

(56) References Cited

U.S. PATENT DOCUMENTS

| 6,536,904 B2* | 3/2003 | Kunzman ........................ 353/31 |
| 7,602,408 B2* | 10/2009 | Plut ............................... 345/690 |
| 2005/0073655 A1* | 4/2005 | Berman .......................... 353/33 |

FOREIGN PATENT DOCUMENTS

JP    2002-287247    10/2002

* cited by examiner

*Primary Examiner* — Ke Xiao
*Assistant Examiner* — Kyle Zhai
(74) *Attorney, Agent, or Firm* — NDQ&M Watchstone LLP

(57) ABSTRACT

The image signal converting apparatus is used in a lighting unit. The lighting unit includes a liquid crystal panel modulating a red component light according to a red image signal, a liquid crystal panel modulating a green component light according to a green image signal, and a liquid crystal panel modulating a blue component light according to a blue image signal. Yellow component light is superimposed on any of the red component light, the green component light and the blue component light. The image signal converting apparatus includes a controlling unit which controls a superimposition amount of yellow component light based on a specific image signal among a red image signal, a green image signal, and a blue image signal. A color corresponding to the specific image signal has a hue adjacent to a hue corresponding to the yellow component light. The controlling unit controls a reduction amount of the specific image signal based on the superimposition amount.

3 Claims, 14 Drawing Sheets

IMAGE SIGNAL CONVERTING APPARATUS AND IMAGE DISPLAY APPARATUS

CROSS REFERENCE TO RELATED APPLICATION

This application is based upon and claims the benefit of priority from Japanese Patent Application No. 2007-258087, filed on Oct. 1, 2007; the entire contents of which are incorporated herein by reference.

BACKGROUND OF THE INVENTION

1. Field of the Invention

The present invention relates to an image signal converting apparatus and an image display apparatus using fourth color component light in addition to red component light, green component light and blue component light.

2. Description of the Related Art

Three-plate projection image display apparatuses have heretofore been widely known, which include a red liquid crystal panel modulating a red component light, a green liquid crystal panel modulating a green component light and a blue liquid crystal panel modulating a blue component light.

To increase luminance and to reduce power consumption, proposed is a projection image display apparatus which uses fourth color component light (e.g., yellow component light) in addition to red component light, green component light, and blue component light (e.g., Japanese Patent Application Publication No. 2002-287247 (claims 1 and 4, FIG. 1 and the like)).

Specifically, in such projection image display apparatus, an improvement of the luminance of an image projected on a screen can be achieved by using yellow component light in addition to red component light, green component light and blue component light.

However, in the above-described projection image display apparatus, a mere addition of the yellow component light causes an image to be shifted to the yellow side. Thus, color reproducibility of the image is deteriorated by using the yellow component light.

SUMMARY OF THE INVENTION

A first aspect of the invention is summarized as an image signal converting apparatus used in a lighting apparatus that includes a red-light imager (liquid crystal panel 30R) modulating a red component light according to a red image signal, a green-light imager (liquid crystal panel 30G) modulating a green component light according to a green image signal, and a blue-light imager (liquid crystal panel 30B) modulating a blue component light according to a blue image signal, in the lighting apparatus, a fourth color component light being superimposed on any of the red component light, the green component light, and the blue component light. The image signal converting apparatus comprises a controlling unit (controlling unit 130) for controlling a superimposition amount of the fourth color component light based on a specific image signal among the red image signal, the green image signal, and the blue image signal. A color corresponding to the specific image signal is one having a hue adjacent to a hue corresponding to the fourth color component light. The controlling unit controls a reduction amount of the specific image signal based on the superimposition amount.

According to this aspect, the color corresponding to the specific image signal is one having a hue adjacent to a hue corresponding to the fourth color component light. The controlling unit controls a reduction amount of the specific image signal based on the superimposition amount.

Therefore, while intending to improve the luminance of an image by using the fourth color component light, deterioration of color reproducibility of the image caused by the use of fourth color component light can be controlled.

According to this aspect, the controlling unit controls the superimposition amount using a color reproduction parameter $\alpha$ for controlling a light amount of the fourth color component light. The color reproduction parameter $\alpha$ is a parameter determined so that the light amount of the fourth color component light increases along with an increase in saturation of an image.

According to this aspect, the controlling unit controls the superimposition amount using a luminance parameter $\beta_1$ for controlling a light amount of the fourth color component light. The luminance parameter $\beta_1$ is a parameter determined so that the light amount of the fourth color component light decreases along with an increase in saturation of an image.

According to this aspect, the controlling unit controls the superimposition amount using a luminance parameter $\beta_2$ for controlling a light amount of the fourth color component light. The luminance parameter $\beta_2$ is a parameter determined so that the light amount of the fourth color component light increases until the luminance of an image reaches a predetermined threshold value, and that the light amount of the fourth color component light decreases after the luminance of the image exceeds the predetermined threshold value.

A second aspect of the invention is summarized as an image display apparatus that includes a red-light imager modulating a red component light according to a red image signal, a green-light imager modulating a green component light according to a green image signal, and a blue-light imager modulating a blue component light according to a blue image signal. A fourth color component light is superimposed on any of the red component light, the green component light, and the blue component light. The image display apparatus comprises a color combining unit (cross dichroic cube 60) for combining red component light emitting from the red light imager, green component light emitting from the green light imager, and blue component light emitting from the blue light imager. The image display apparatus also comprises a controlling unit (controlling unit 130) for controlling a superimposition amount of the fourth color component light based on a specific image signal among the red image signal, the green image signal, and the blue image signal. A color corresponding to the specific image signal is one having a hue adjacent to a hue corresponding to the fourth color component light. The controlling unit controls a reduction amount of the specific image signal based on the superimposition amount.

DESCRIPTION OF THE PREFERRED EMBODIMENT

Hereinafter, the embodiments of the present invention are described with reference to the accompanying drawings. Note that, in the description of the following drawings, the same or similar parts are denoted by the same or similar symbols.

However, it should be noted that the drawings are diagrammatical and each dimension ratio is different from the actual one. Therefore, the following description should be taken into consideration to judge specific dimensions and the like. Also, a part in which dimensional relationship and ratio are different between drawings is of course included.

[First Embodiment]
(Schematic Description of Projection Image Display Apparatus)

Figure 1:
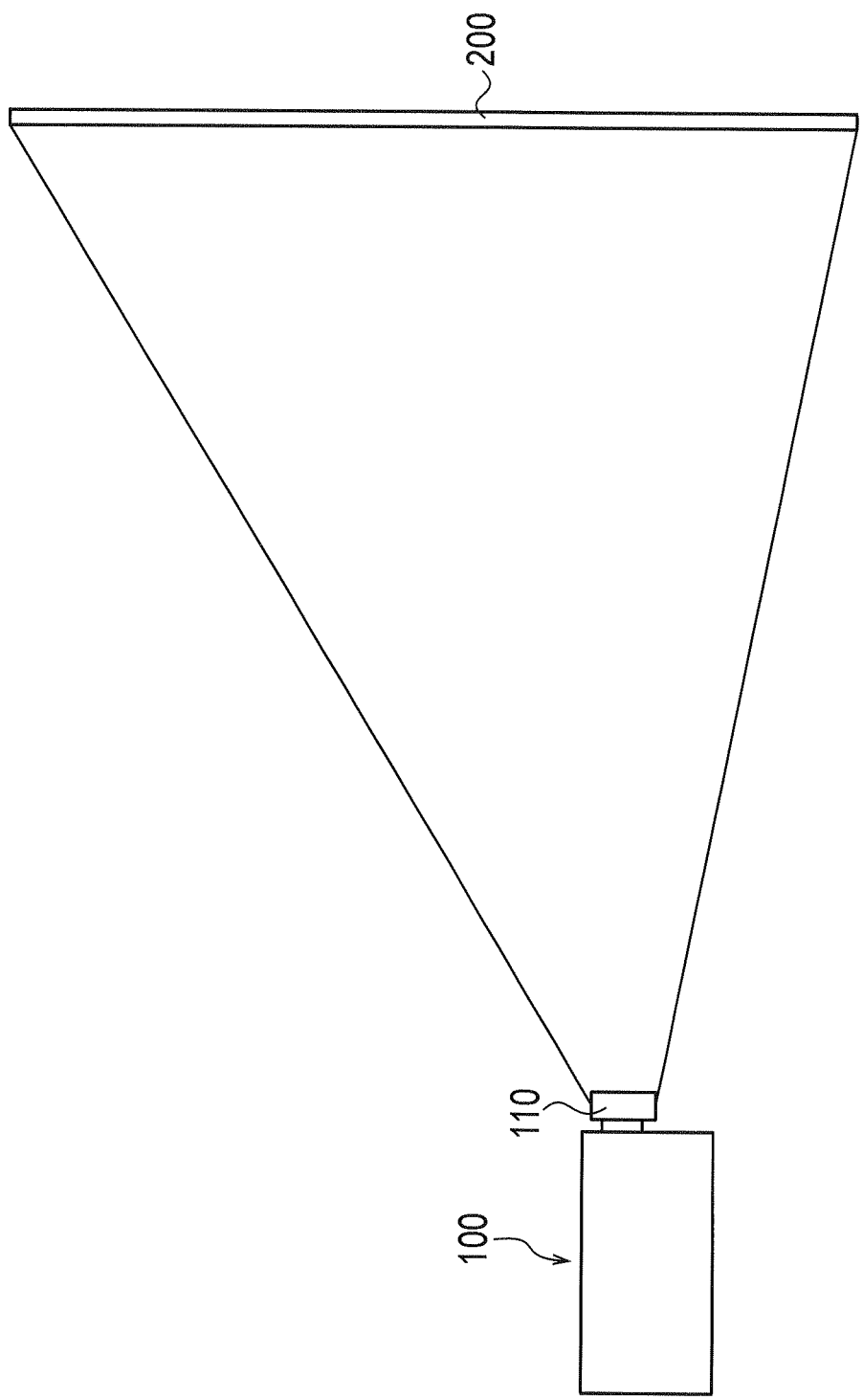
FIG. 1 is a schematic diagram of a projection image display apparatus 100 according to a first embodiment.

A summary of a projection image display apparatus of the first embodiment is described below with reference to drawings. FIG. 1 is a schematic diagram of the projection image display device 100 of the first embodiment of the invention.

As shown in FIG. 1, the projection image display apparatus 100 includes a projection lens unit 110, and projects image light magnified by the projection lens unit 110 on a screen 200. As described later, the projection image display apparatus 100 uses yellow component light as fourth color component light in addition to red component light, green component light and blue component light.

(Schematic Configuration of Lighting Unit)

Figure 2:
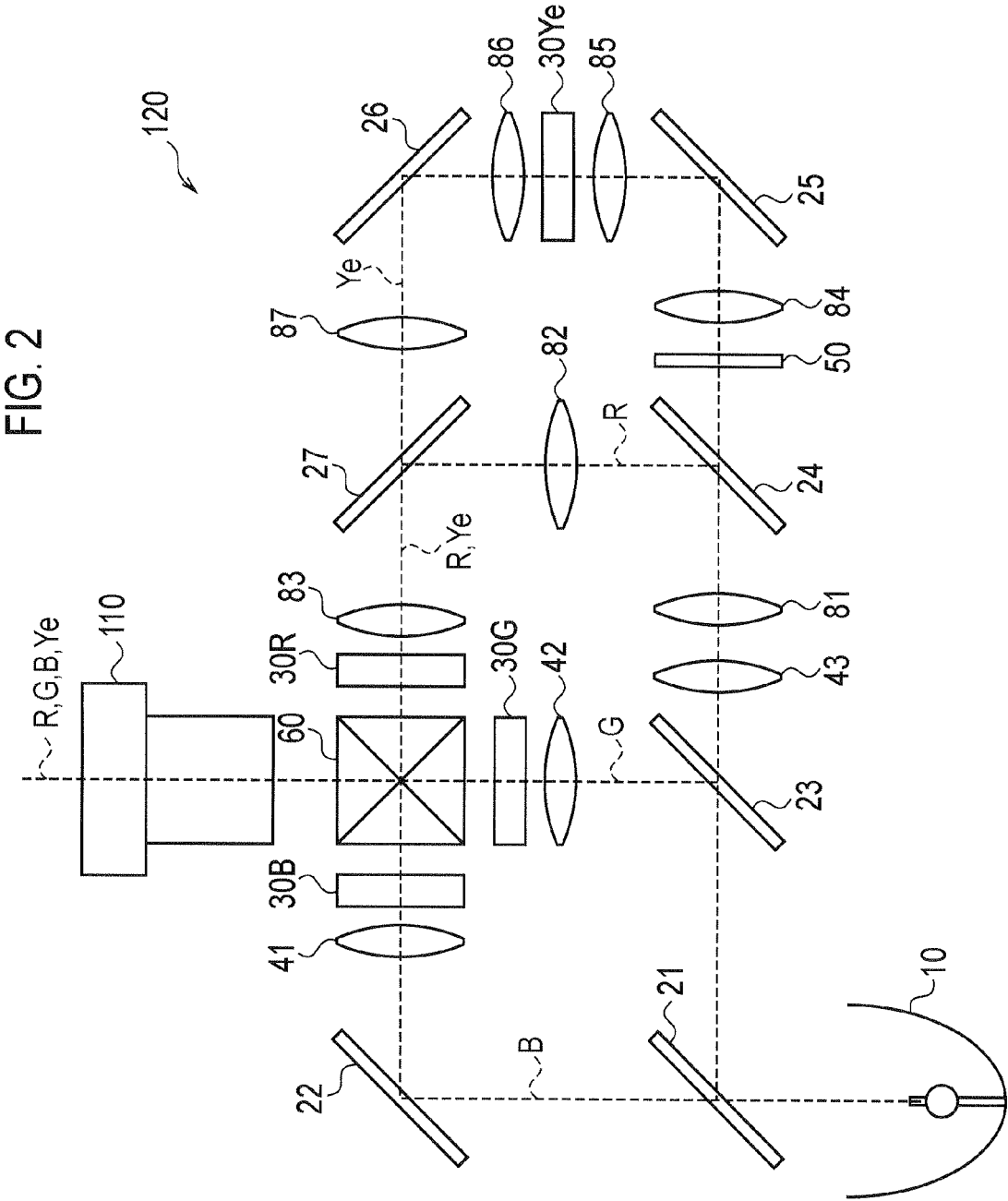
FIG. 2 is a view showing a configuration of a lighting unit 120 according to the first embodiment.

A schematic configuration of a lighting unit of the first embodiment is described below with reference to the drawings. FIG. 2 is a view showing a schematic configuration of the lighting unit 120 of the first embodiment. It should be noted that in FIG. 2, fly-eye lenses which uniformize light emitted from a light source 10, a Polarized Beam Splitter (PBS) which aligns a polarization direction of the light emitted from the light source 10, and the like are omitted.

As shown in FIG. 2, the lighting unit 120 includes the light source 10, a plurality of liquid crystal panels 30 (a liquid crystal panel 30R, a liquid crystal panel 30G, a liquid crystal panel 30B and a liquid crystal panel 30Ye), and a cross dichroic cube 60. Incidentally, it should be noted that in FIG. 2, while being depicted, the projection lens unit 110 is not included in the lighting unit 120.

Figure 3:
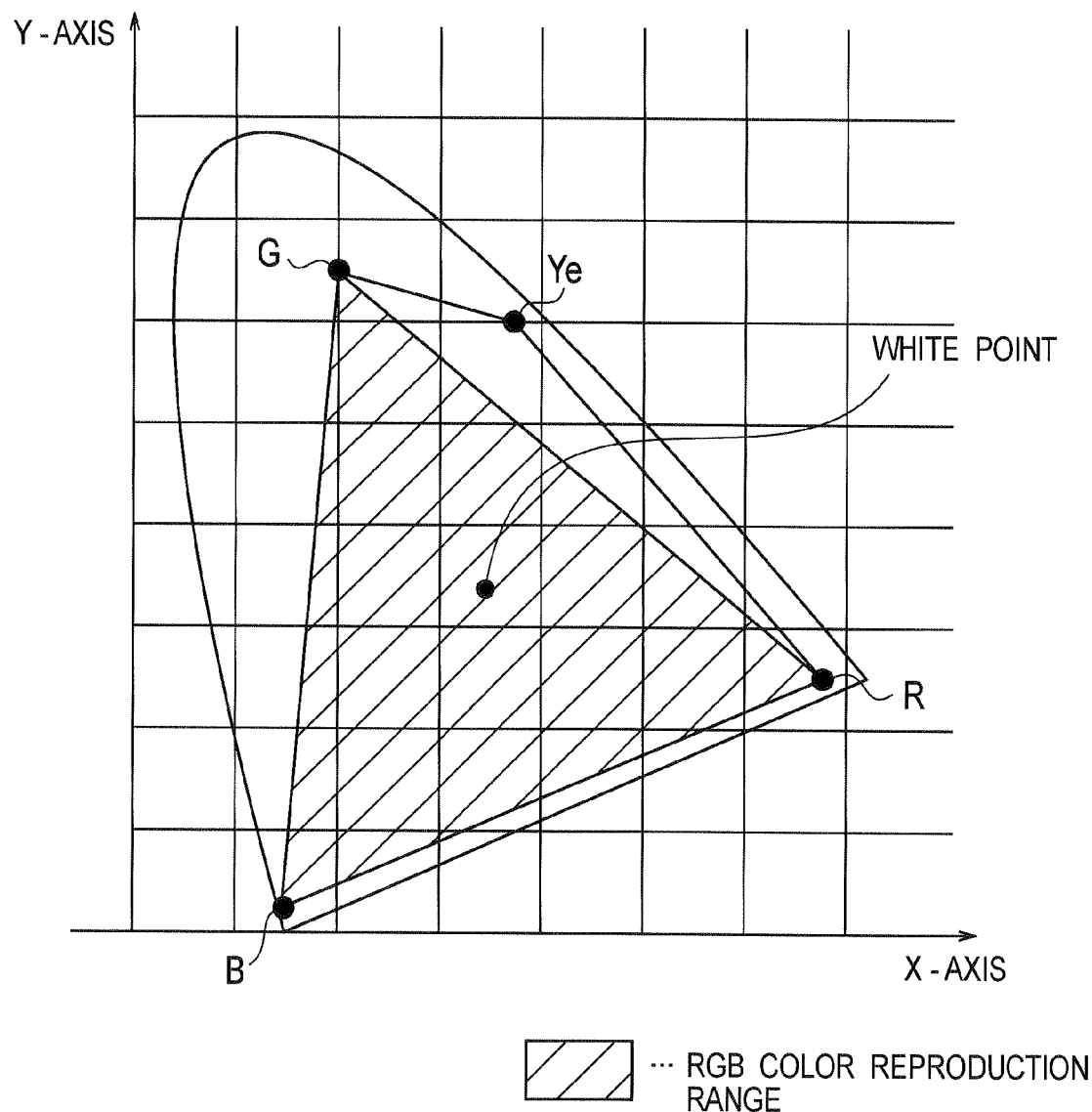
FIG. 3 is a view showing a color reproduction range according to the first embodiment.

The light source 10 is a UHP lump which emits white light. That is, light emitted from the light source 10 at least includes the red component light, the green component light, the blue component light and the yellow component light. Further, as shown in FIG. 3, among red, green, and blue, red and green are colors having hues adjacent to yellow.

In addition, when using three primary colors (red, green and blue) of light, in a broad sense, it may be considered that a complementary color of red is cyan, a complementary color of green is magenta, and a complementary color of blue is yellow.

Further, the yellow component light is superimposed on any one of or on both of the red component light and the green component light. In this embodiment, the yellow component light is superimposed on the red component light, and enters the liquid crystal panel 30R.

As described later, the liquid crystal panel 30R modulates the red component light according to a red image signal (a red output signal $R_{out}$ calculated from a red input signal $R_{in}$). In addition, on the light entering side and the light emitting side of the liquid crystal panel 30R, a pair of polarizing plates (not shown) is provided.

Similarly, the liquid crystal panel 30G modulates the green component light according to a green image signal (a green output signal $G_{out}$ calculated from a green input signal $G_{in}$), and the liquid crystal panel 30B modulates the blue component light according to a blue image signal (a blue output signal $B_{out}$ calculated from a blue input signal $B_{in}$). In addition, on the light entering sides and the light emitting sides of the liquid crystal panel 30G and the liquid crystal panel 30B, pairs of polarizing plates (not shown) are provided.

Meanwhile, the liquid crystal panel 30Ye modulates the yellow component light according to a control signal (yellow control signal) calculated based on specific image signals (a red image signal and a green image signal). In addition, at least on one of the light entering side and the light emitting side of the liquid crystal panel 30Ye, a polarizing plate (not shown) may be provided.

Here, colors (red and green) corresponding to the specific image signals (the red image signal and the green image signal) have hues adjacent to hue corresponding to the fourth color component light (yellow component light).

Light emitting from the liquid crystal panel 30Ye enters the liquid crystal panel 30R. That is, the liquid crystal panel 30R is disposed on a light path of the light emitting from the liquid crystal panel 30Ye, and is in between a position where light emits from the liquid crystal panel 30Ye and a position where the light emitting therefrom enters a cross dichroic cube 60.

Incidentally, it should be noted that the control of a modulation amount of the liquid crystal panel 30Ye is to control an amount of the yellow component light passing through the liquid crystal panel 30Ye. That is, the control of a modulation amount of the liquid crystal panel 30Ye is a control of a superimposition amount of yellow component light which is superimposed on the red component light.

It is preferable that light emitting from the liquid crystal panel 30Ye cause an image to be substantially formed on the liquid crystal panel 30R. For example, between the liquid crystal panel 30Ye and the liquid crystal panel 30R, relay lenses (a lens 86, a lens 87, and a lens 83) and the like are disposed on the light path of light emitting from the liquid crystal panel 30Ye. Thus, it becomes possible for the light emitting from the liquid crystal panel 30Ye to cause an image to be substantially formed on the liquid crystal panel 30R. It should be noted here that the substantial formation of an image is a concept including image formation.

Resolution of the liquid crystal panel 30Ye is different from those of the liquid crystal panels 30R, 30G, and 30B. Specifically, to display a fine image on the screen 200, the liquid crystal panels 30R, 30G, and 30B have high resolution. Meanwhile, light emitting from the liquid crystal panel 30Ye is mainly used as illumination light. Therefore, in order not to deteriorate use efficiency of light due to electrodes provided to the liquid crystal panel, it is preferable that the resolution of the liquid crystal panel 30Ye is lower than those of the liquid crystal panels 30R, 30G, and 30B. Since it is only necessary to adjust the amount of the yellow component light for each target region, it is sufficient even if the resolution of the liquid crystal panel 30Ye is low.

Incidentally, what is meant by low resolution is a concept including a case where the liquid crystal panel 30Ye does not have a resolution. Accordingly, the liquid crystal panel 30Ye is not necessarily configured so that it is capable of controlling an amount of modulation for each of a plurality of regions, and may have a configuration in which an amount of modulation of only the entire surface is controlled.

Further, the resolution of the liquid crystal panel 30Ye may be the same as those of the liquid crystal panels 30R, 30G, and 30B.

The cross dichroic cube 60 is a color combining unit for combining light emitting from the liquid crystal panels 30R, 30G, and 30B. That is, the cross dichroic cube 60 synthesizes the red component light and the yellow component light emitting from the liquid crystal panel 30R, the green component light emitting from the liquid crystal panel 30G and the blue component light emitting from the liquid crystal panel 30B. The cross dichroic cube 60 emits synthesis light (image light) including the red component light, the green component light, the blue component light, and the yellow component light to the side of the projection lens unit 110.

The projection lens unit 110 projects, on the screen 200, the synthesis light (image light) synthesized by the cross dichroic cube 60 as described above.

Returning to FIG. 2, the lighting unit 120 includes a plurality of mirrors (mirrors 21 to 27). The mirror 21 is a dichroic mirror which transmits the blue component light and reflects other light including the red component light, the green component light and the yellow component light. The mirror 22 is a mirror which reflects the blue component light toward the liquid crystal panel 30B. The mirror 23 is a dichroic mirror which reflects the green component light toward the liquid crystal panel 30G and which transmits other light including the red component light and the yellow component light. The mirror 24 is a dichroic mirror which reflects the red component light toward the liquid crystal panel 30R and which transmits other light including the yellow component light. The mirror 25 is a mirror which reflects the yellow component light toward the liquid crystal panel 30Ye. The mirror 26 is a mirror which reflects the yellow component light toward the liquid crystal panel 30R. The mirror 27 is a dichroic mirror which transmits light (yellow component light) emitting from the liquid crystal panel 30Ye and which reflects the red component light toward the liquid crystal panel 30R.

Here, the mirrors 21, 23, and 24 constitute a color separator which separates light emitted from the light source 10 into red component light, green component light, blue component light, and yellow component light.

The lighting unit 120 includes a plurality of lenses (lenses 41 to 43, and lenses 81 to 87). The lens 41 is a condenser lens which substantially parallelizes the blue component light reflected by the mirror 22 so that the liquid crystal panel 30B is illuminated with the blue component light. The lens 42 is a condenser lens which substantially parallelizes the green component light reflected by the mirror 23 so that the liquid crystal panel 30G is illuminated with the green component light. The lens 43 is a condenser lens which substantially parallelizes the red component light that passes through the mirror 23 so that the liquid crystal panel 30R is illuminated with the red component light. Similarly, the lens 43 is a condenser lens which substantially parallelizes the yellow component light that passes through the mirror 23 so that the liquid crystal panel 30Ye is illuminated with the yellow component light.

The lenses 81 to 83 are relay lenses with which the red component light substantially parallelized by the lens 43 substantially forms an image on the liquid crystal panel 30R. The lenses 81, 84, and 85 are relay lenses with which the yellow component light substantially parallelized by the lens 43 substantially forms an image on the liquid crystal panel 30Ye. The lenses 86, 87, and 83 are relay lenses with which the yellow component light substantially forms an image on the liquid crystal panel 30R while controlling expansion of the yellow component light emitted from the liquid crystal panel 30Ye.

The lighting unit 120 includes a wave plate 50 which rotates a polarization direction of the yellow component light by 90°. Specifically, the wave plate 50 rotates the polarization direction of yellow component light which is aligned with that of red component light by 90 degrees, and emits the yellow component light toward the liquid crystal panel 30Ye.

Here, when the polarization direction of the yellow component light emitted from the liquid crystal panel 30Ye is different from that of the red component light entering the liquid crystal panel 30R, the yellow component light is blocked by a polarizing plate disposed on the entering side of the liquid crystal panel 30R.

Accordingly, the matter whether to apply a voltage to the liquid crystal panel 30Ye is controlled in accordance with a relationship between an application state of the voltage and a rotation of polarization light. Described below are a liquid crystal panel of a first type and a liquid crystal panel of a second type, as examples. The liquid crystal panel of first type rotates a polarization direction in a state in which the voltage is not applied, and does not rotate the polarization direction in a state where the voltage is applied. The liquid crystal panel of second type does not rotate the polarization direction in a state where the voltage is not applied, and rotates the polarization direction in a state where the voltage is applied.

(1) Case Where the Liquid Crystal Panel 30Ye is of First Type (1-1) Case Where the Wave Plate 50 is not Disposed When turning off the yellow component light, the voltage is not applied to the liquid crystal panel 30Ye. Here, since the liquid crystal panel 30Ye rotates the polarization direction of the yellow component light, the polarization direction of the yellow component light is different from that of the red component light. Thus, the yellow component light is blocked by the polarizing plate disposed on the light entering side of the liquid crystal panel 30R.

When turning on the yellow component light, the voltage is applied to the liquid crystal panel 30Ye. Here, since the liquid crystal panel 30Ye does not rotate the polarization direction of the yellow component light, the polarization direction of the yellow component light is the same as that of the red component light.

(1-2) Case Where the Wave Plate 50 is Disposed

When turning off the yellow component light, the voltage is applied to the liquid crystal panel 30Ye. Here, the wave plate 50 rotates the polarization direction of the yellow component light. Thereafter, since the liquid crystal panel 30Ye does not rotate the polarization direction of the yellow component light, the polarization direction of the yellow component light is different from that of the red component light. Thus, the yellow component light is blocked by the polarizing plate disposed on the light entering side of the liquid crystal panel 30R.

When turning on the yellow component light, the voltage is not applied to the liquid crystal panel 30Ye. Here, the wave plate 50 rotates the polarization direction of the yellow component light. Thereafter, since the liquid crystal panel 30Ye further rotates the polarization direction of the yellow component light, the polarization direction of the yellow component light is the same as that of the red component light.

(2) Case Where the Liquid Crystal Panel 30Ye is of Second Type.

(2-1) Case Where the Wave Plate 50 is not Disposed.

When turning off the yellow component light, the voltage is applied to the liquid crystal panel 30Ye. Here, since the liquid crystal panel 30Ye rotates the polarization direction of the yellow component light, the polarization direction of the yellow component light is different from that of the red component light. Thus, the yellow component light is blocked by the polarizing plate disposed on the light entering side of the liquid crystal panel 30R.

When turning on the yellow component light, the voltage is not applied to the liquid crystal panel 30Ye. Here, since the liquid crystal panel 30Ye does not rotate the polarization direction of the yellow component light, the polarization direction of the yellow component light is the same as that of the red component light.

(2-2) Case Where the Wave Plate 50 is Disposed.

When turning off the yellow component light, the voltage is not applied to the liquid crystal panel 30Ye. Here, the wave plate 50 rotates the polarization direction of the yellow component light. Thereafter, since the liquid crystal panel 30Ye does not rotate the polarization direction of the yellow component light, the polarization direction of the yellow component light is different from that of the red component light. Thus, the yellow component light is blocked by the polarizing plate disposed on the light entering side of the liquid crystal panel 30R.

When turning on the yellow component light, the voltage is applied to the liquid crystal panel 30Ye. Here, the wave plate 50 rotates the polarization direction of the yellow component light. Thereafter, since the liquid crystal panel 30Ye further rotates the polarization direction of the yellow component light, the polarization direction of the yellow component light becomes the same as that of the red component light.

TABLE 1

| mirror 24 | Narrow-band wave plate 50 | | Liquid Crystal Panel 30Ye | | Liquid Crystal Panel 30R | |
|---|---|---|---|---|---|---|
| Polarization direction (emission) of yellow component light Ye | present or not | Polarization direction (emission) of yellow component light Ye | voltage | Polarization direction (emission) of yellow component light Ye | Polarization direction (incident) of yellow component light Ye | On or OFF |
| Liquid Crystal Panel 30Ye = First Type | | | | | | |
| =red component light R | present | ≠red component light R | ON | ≠red component light R | ≠red component light R | OFF |
| | present | ≠red component light R | OFF | =red component light R | =red component light R | ON |
| | not present | =red component light R | OFF | =red component light R | =red component light R | ON |
| | not present | =red component light R | ON | ≠red component light R | ≠red component light R | OFF |
| Liquid Crystal Panel 30Ye = Second Type | | | | | | |
| =red component light R | present | ≠red component light R | ON | =red component light R | =red component light R | ON |
| | present | ≠red component light R | OFF | ≠red component light R | ≠red component light R | OFF |
| | not present | =red component light R | OFF | ≠red component light R | ≠red component light R | OFF |
| | not present | =red component light R | ON | =red component light R | =red component light R | ON |

Here, Table 1 represents a relationship between an application state of the voltage and the rotation of the polarization direction as described above.

(Function of the Projection Image Display Apparatus)

Figure 4:
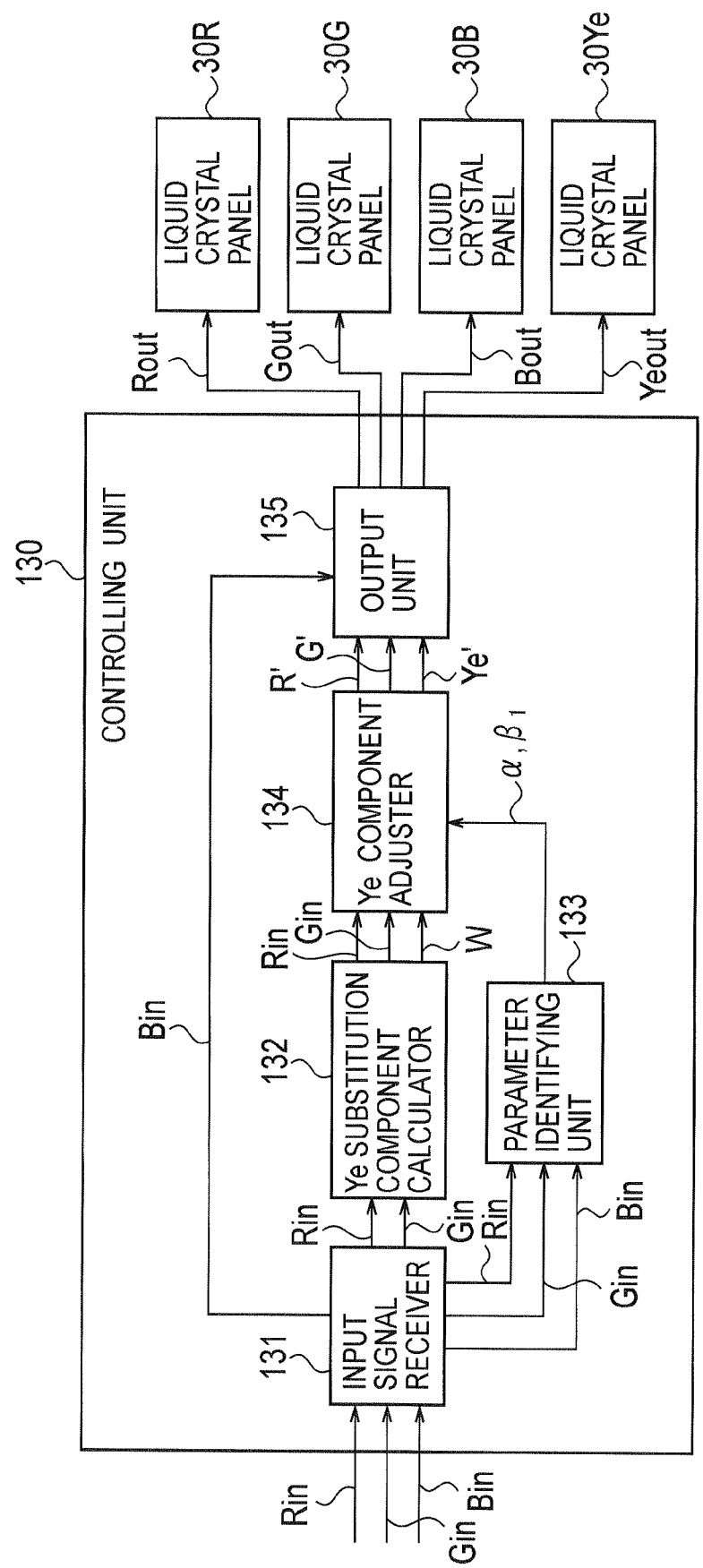
FIG. 4 is a block diagram showing a configuration of a controlling unit 130 according to the first embodiment.

A function of the projection image display apparatus of the first embodiment is described below with reference to the drawings. FIG. 4 is a block diagram showing the function of the projection image display apparatus 100 (a controlling unit 130) of the first embodiment.

As shown in FIG. 4, the controlling unit 130 includes an input signal receiver 131, a Ye substitution component calculator 132, a parameter identifying unit 133, a Ye component adjuster 134, and an output unit 135.

The input signal receiver 131 acquires a red input signal $R_{in}$, a green input signal $G_{in}$, and a blue input signal $B_{in}$. The input signal receiver 131 inputs the red input signal $R_{in}$, the green input signal $G_{in}$, and the blue input signal $B_{in}$ into the parameter identifying unit 133. The input signal receiver 131 inputs the red input signal $R_{in}$ and the green input signal $G_{in}$ into the Ye substitution component calculator 132.

Before inputting it into the input signal receiver 131, a reverse gamma correction is made to each of the red input signal $R_{in}$, the green input signal $G_{in}$, and the blue input signal $B_{in}$.

The Ye substitution component calculator 132 calculates a Ye substitution signal W corresponding to a component (Ye substitution component) of yellow component light which is substitutable for red component light and green component light.

Here, yellow component light having an amount of light which is the same as those of the red component light and the green component light is substitutable for the red component light and the green component light. Therefore, Ye substitution signal W having the same signal intensities as those of the red input signal $R_{in}$ and the green input signal $G_{in}$ is substitutable for the red input signal $R_{in}$ and the green input signal $G_{in}$.

Accordingly, the Ye substitution component calculator 132 calculates a Ye substitution signal W using the following formula (1) based on the red input signal $R_{in}$ and the green input signal $G_{in}$.

[Equation 1]

$$W = \min(R_{in}, G_{in}) \qquad \text{Formula (1)}$$

Incidentally, min ($R_{in}$, $G_{in}$) represents an input signal having a lower signal intensity between the red input signal $R_{in}$ and the green input signal $G_{in}$.

The Ye substitution component calculator 132 inputs the red input signal $R_{in}$, the green input signal $G_{in}$, and the Ye substitution signal W into the Ye component adjuster 134.

The parameter identifying unit 133 calculates saturation and luminance of an image (red R, green G, blue B, and yellow Ye) which is reproduced from the red input signal $R_{in}$, the green input signal $G_{in}$, and the blue input signal $B_{in}$. Subsequently, referring to FIGS. 5A to 5C, the parameter identifying unit 133 identifies parameters (a color reproduction parameter $\alpha$, a luminance parameter $\beta_1$, a luminance parameter $\beta_2$), and inputs the identified parameters into the Ye component adjuster 134.

Figure 5A:
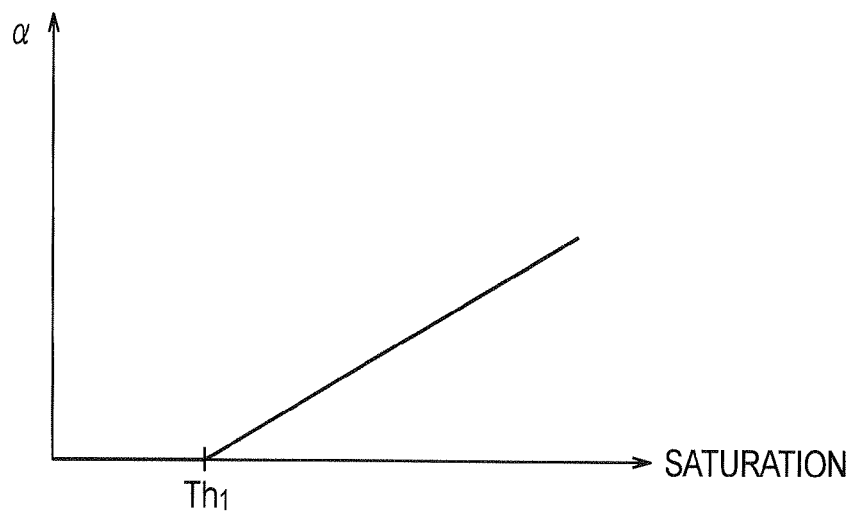
FIGS. 5A to 5C are views showing a color reproduction parameter $\alpha$, a luminance parameter $\beta_1$, and a luminance parameter $\beta_2$ according to the first embodiment.

More specifically, as shown in FIG. 5A, the color reproduction parameter $\alpha$ remains constant until the saturation of an image (yellow Ye in particular) reaches $Th_1$. Meanwhile, the color reproduction parameter $\alpha$ is set so that after the saturation of the image exceeds $Th_1$, the color reproduction parameter $\alpha$ increases along with an increase in saturation of the image. That is, the color reproduction parameter $\alpha$ is set so that when a distance between the saturation of an image and a white point is larger than a certain distance, an amount of the yellow component light increases as the saturation of the image moves away from the white point. Thus, yellow Ye in a range which could not be reproduced by the red component light, the green component light, and the blue component light is reproduced by the yellow component light, and the color reproducibility of the image is improved.

It should be noted that the white point is a point at which respective component lights are combined when reproducing white color.

Figure 5B:
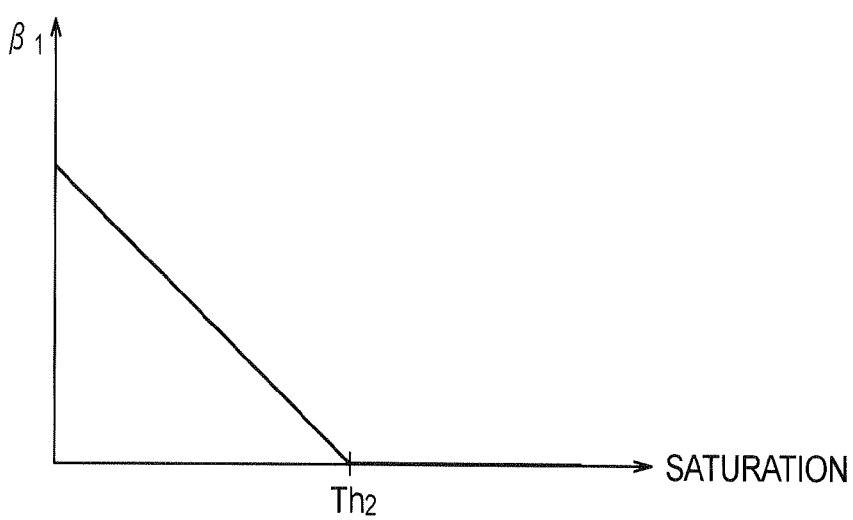

As shown in FIG. 5B, the luminance parameter $\beta_1$ is set so that until the saturation of an image (blue B in particular) reaches $Th_2$, the luminance parameter $\beta_1$ decreases along with increasing in saturation of the image. Meanwhile, the luminance parameter $\beta_1$ remains constant when the saturation of the image exceeds $Th_2$. That is, the luminance parameter $\beta_1$ is set so that when a distance between the saturation of an image and a white point being is set to be within a certain distance, an amount of the yellow component light decreases as the saturation of the image moves away from the white point.

Figure 5C:
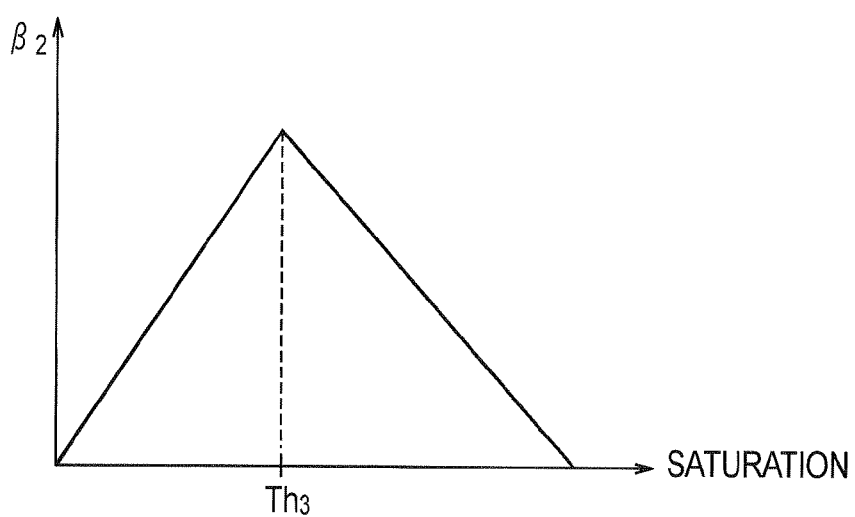

As shown in FIG. 5C, the luminance parameter $\beta_2$ is set so that the luminance parameter $\beta_2$ increases until the luminance of an image reaches $Th_3$, and decreases after the luminance of an image exceeds $Th_3$. That is, the luminance parameter $\beta_2$ is set so that an amount of the yellow component light attains its peak value when the luminance of the image is $Th_3$ and decreases from thereon. Thus, when the luminance of an image is low, "black out effect" is controlled, and when the luminance of an image is high, "white out effect" is controlled.

Here, although not shown in FIGS. 5A to 5C, the color reproduction parameter $\alpha$, the luminance parameter $\beta_1$, and the luminance parameter $\beta_2$ may be determined for each color phase corresponding to each one of red, green and blue. Further, the color reproduction parameter $\alpha$, the luminance parameter $\beta_1$, and the luminance parameter $\beta_2$ may have different values for each color phase.

Based on the red input signal $R_{in}$, the green input signal $G_{in}$, and the Ye substitution signal W, the Ye component adjuster 134 calculates a red adjustment signal R', a green adjustment signal G', and a yellow adjustment signal Ye'.

In this embodiment, when calculating the red adjustment signal R', the green adjustment signal G', and the yellow adjustment signal Ye', the Ye component adjuster 134 uses the color reproduction parameter $\alpha$ and the luminance parameter $\beta_1$. Specifically, the Ye component adjuster 134 calculates the red adjustment signal R', the green adjustment signal G', and the yellow adjustment signal Ye' using Formula (2) to Formula (4) shown below.

[Equation 2]

$$R' = R_{in} - W \times \alpha \qquad \text{Formula (2)}$$

$$G' = G_{in} - W \times \alpha \qquad \text{Formula (3)}$$

$$Ye' = W \times (\alpha + \beta_1) \qquad \text{Formula (4)}$$

Thus, based on the red input signal $R_{in}$ and the green input signal $G_{in}$, the Ye component adjuster 134 calculates a superimposition amount of the yellow component light (Ye substitution signal W). Based on the superimposition amount of the yellow component light (Ye substitution signal W), the Ye component adjuster 134 controls reduction amounts of the red input signal $R_{in}$ and the green input signal $G_{in}$.

The output unit 135 outputs a red output signal $R_{out}$, a green output signal $G_{out}$, a blue output signal $B_{out}$, and a yellow output signal $Ye_{out}$ to the respective liquid crystal panels 30. More specifically, the output unit 135 outputs the red adjustment signal R' to the liquid crystal panel 30R as the red output signal Rout. Similarly, the output unit 135 outputs the green adjustment signal G' and the yellow adjustment signal Ye' to the liquid crystal panel 30G and the liquid crystal panel 30Ye as the green output signal $G_{out}$ and the yellow output signal $Ye_{out}$. Meanwhile, the output unit 135 outputs the blue input signal $B_{in}$ directly to the liquid crystal panel 30B as the blue output signal $B_{out}$.

Before being inputted into the respective liquid crystal panels 30, a gamma correction is made to each of the red output signal $R_{out}$, the green output signal $G_{out}$, the blue output signal $B_{out}$, and the yellow output signal $Ye_{out}$.

(Operation of the Projection Image Display Apparatus)

Figure 6:
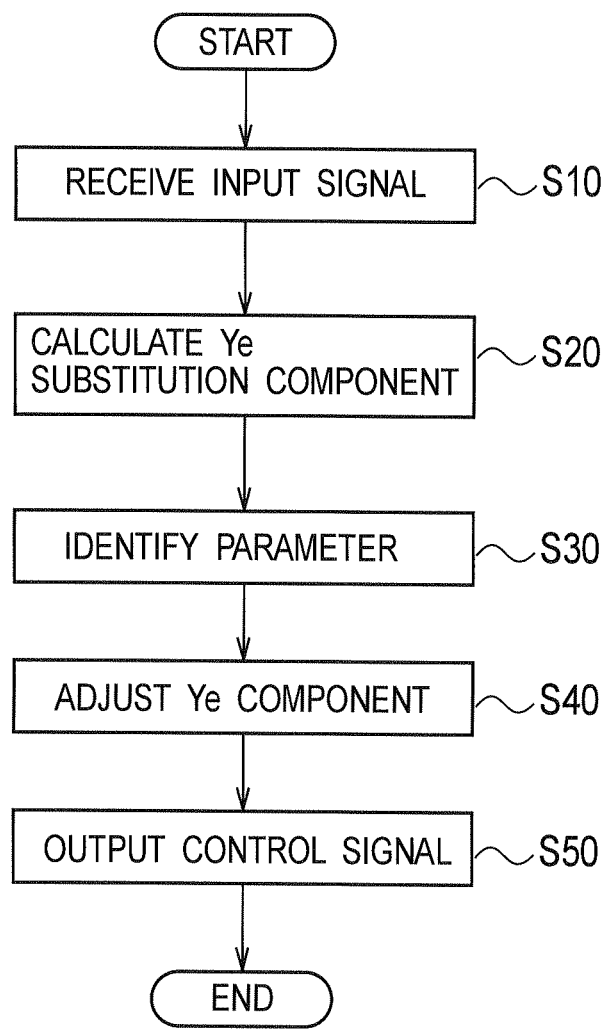
FIG. 6 is a flowchart showing operation of the projection image display device 100 according to the first embodiment.

Operation of the projection image display apparatus of the first embodiment is described below with reference to the drawings. FIG. 6 is a flowchart showing operation of the projection image display apparatus 100 thereof.

As shown in FIG. 6, in Step 10, the projection image display apparatus 100 receives the red input signal $R_{in}$, the green input signal $G_{in}$, and the blue input signal $B_{in}$.

In Step 20, the projection image display apparatus 100 calculates the Ye substitution signal W based on the red input signal $R_{in}$ and the green input signal $G_{in}$. More specifically, the projection image display apparatus 100 calculates the Ye substitution signal W using Formula (1) shown below.

[Equation 3]

$$W = \min(R_{in}, G_{in}) \quad \text{Formula (1)}$$

Incidentally, min ($R_{in}$, $G_{in}$) represents an input signal having a lower signal intensity among the red input signal $R_{in}$ and the green input signal $G_{in}$.

In Step 30, the projection image display apparatus 100 identifies the color reproduction parameter α and the luminance parameter $β_1$ based on the saturation of an image and the luminance thereof. Specifically, referring to FIG. 5 described above, the projection image display apparatus 100 identifies the luminance parameter $β_1$ with reference to FIG. 5B described above.

In Step 40, based on the Ye substitution signal W, the projection image display apparatus 100 calculates the red adjustment signal R', the green adjustment signal G', and the yellow adjustment signal Ye'. Specifically, the projection image display apparatus 100 calculates the respective adjustment signals using Formula (2) to Formula (4) shown below.

[Equation 4]

$$R' = R_{in} - W \times α \quad \text{Formula (2)}$$

$$G' = G_{in} - W \times α \quad \text{Formula (3)}$$

$$Ye' = W \times (α + β_1) \quad \text{Formula (4)}$$

In Step 50, the projection image display apparatus 100 outputs the red output signal $R_{out}$, the green output signal $G_{out}$, the blue output signal $B_{out}$, and the yellow output signal $Ye_{out}$. More specifically, the projection image display apparatus 100 outputs the red adjustment signal R' to the liquid crystal panel 30R as the red output signal $R_{out}$. Similarly, the projection image display device 100 outputs the green adjustment signal G' and the yellow adjustment signal Ye' to the liquid crystal panel 30G and the liquid crystal panel 30Ye as the green output signal $G_{out}$ and the yellow output signal $Ye_{out}$. Meanwhile, the projection image display apparatus 100 outputs the blue input signal $B_{in}$ directly to the liquid crystal panel 30B as the blue output signal $B_{out}$.

(Operation and Effect)

In the first embodiment, colors (red and green) corresponding to the specific image signals (the red image signal and the green image signal) each have a hue adjacent to a hue corresponding to the fourth color component light (yellow component light). The controlling unit 130 controls a superimposition amount (Ye substitution signal W) of the yellow component light based on the red image signal and the green image signal. The controlling unit 130 controls reduction amounts of the red image signal and the green image signal based on the superimposition amount (Ye substitution signal W) of the yellow component light.

Therefore, while intending to improve the luminance of an image by using the yellow component light, deterioration of color reproducibility of the image caused by the use of yellow component light can be controlled.

The controlling unit 130 generates an yellow output signal $Ye_{out}$ using the color reproduction parameter α determined so that an amount of the yellow component light increases along with an increase in saturation of an image (yellow Ye in particular). Accordingly, the color reproducibility of the image can be effectively improved.

The controlling unit 130 generates the yellow output signal $Ye_{out}$ using the luminance parameter $β_1$ determined so that the amount of the yellow component light decreases along with increase in saturation of an image. Therefore, when the saturation of an image (blue B in particular) is high, the luminance of an image in the vicinity of the white point can be improved, while deterioration of color purity caused by the use of yellow component light is controlled.

Consider a case where the controlling unit 130 generates a yellow output signal $Ye_{out}$ using the luminance parameter $β_2$ determined so that the amount of yellow component light is at its peak when the luminance of an image is $Th_3$ and decreases from thereon. Here, "black out effect" is controlled when the luminance of the image is low, and "white out effect" is controlled when the luminance of the image is high.

[Second Embodiment]

A second embodiment is described below with reference to drawings. Differences between the first embodiment described below and the second embodiment are mainly described below.

Specifically, in the above described first embodiment, the projection image display apparatus 100 outputs the blue input signal $B_{in}$ directly to the liquid crystal panel 30B as the blue output signal $B_{out}$. In contrast, in the second embodiment, the visibilities of red component light, green component light, blue component light, and yellow component light are taken into consideration, and the projection image display apparatus 100 adjusts the red output signal $R_{out}$, a green output signal $G_{out}$, a blue output signal $B_{out}$, and a yellow output signal $Ye_{out}$.

(Functions of the Projection Image Display Apparatus)

Figure 7:
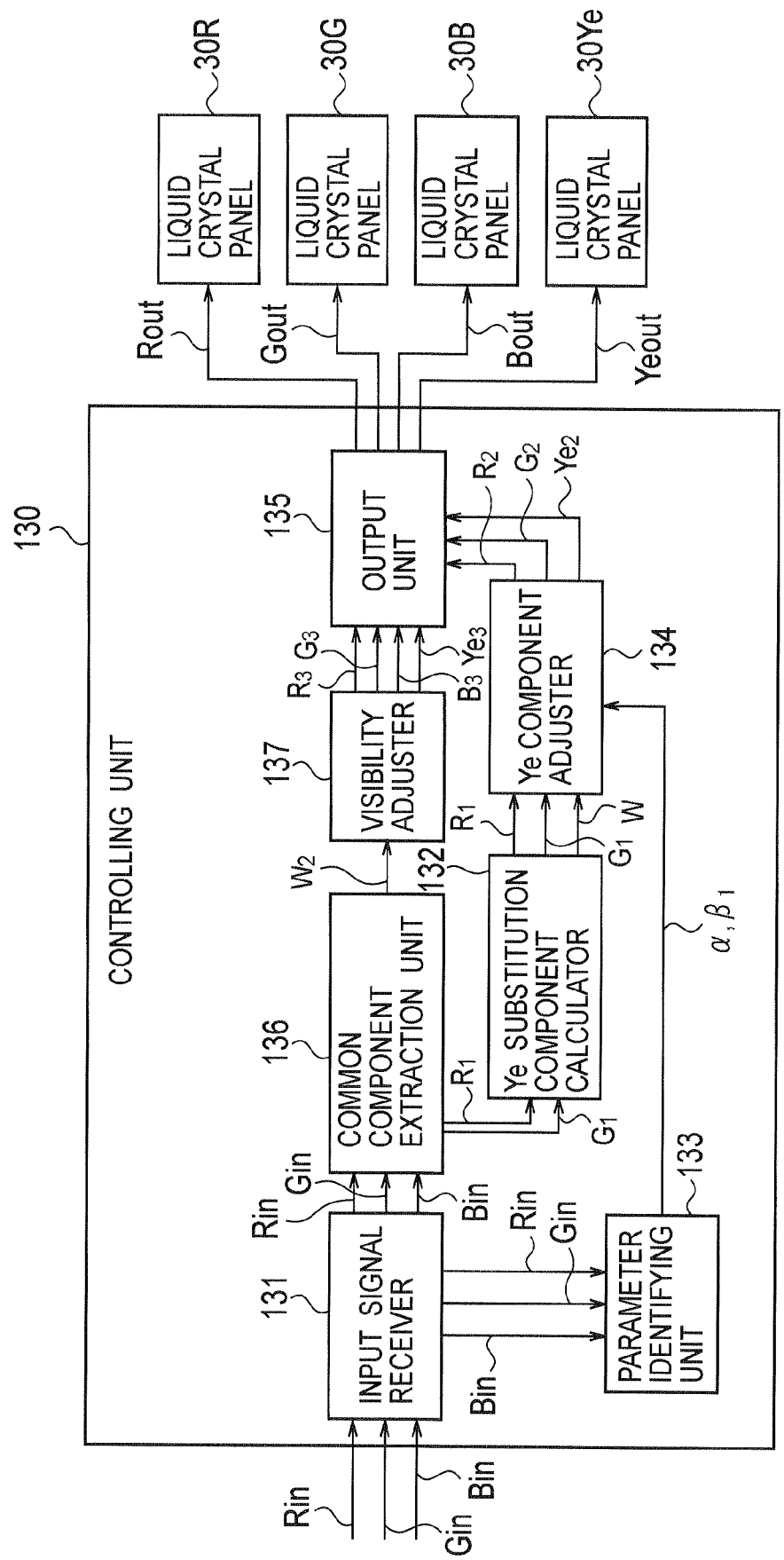
FIG. 7 is a block diagram showing a configuration of a controlling unit 130 according to a second embodiment.

Functions of the projection image display device 100 of the second embodiment are described below by referring to drawings. FIG. 7 is a block diagram showing the functions of the projection image display apparatus 100 (a controlling unit 130) of the second embodiment. Incidentally, it should be noted that in FIG. 7, parts which are the same as those shown in FIG. 4 are given the same reference numerals.

As shown in FIG. 7, the controlling unit 130 includes a common component extraction unit 136 and a visibility adjuster 137 in addition to the configuration shown in FIG. 4.

The common component extraction unit 136 extracts a common signal intensity component $W_2$ common to the red input signal $R_{in}$, the green input signal $G_{in}$, and the blue input signal $B_{in}$. Specifically, the common component extraction unit 136 calculates the common signal intensity component $W_2$ using Formula (5) shown below.

[Equation 5]

$$W_2 = \min(R_{in}, G_{in}, B_{in}) \quad \text{Formula (5)}$$

Incidentally, min ($R_{in}$, $G_{in}$, $B_{in}$) represents an input signal having low signal intensity among the red input signal $R_{in}$, the green input signal $G_{in}$, and the blue input signal $B_{in}$. In the second embodiment, it should be noted that the signal intensity of the blue input signal $B_{in}$ is lower than those of the red input signal $R_{in}$ and the green input signal $G_{in}$.

Subsequently, the common component extraction unit 136 calculates a red intermediate signal $R_1$ and a green intermediate signal $G_1$ by excluding the common signal intensity component $W_2$ from the red input signal $R_{in}$ and the green input signal $G_{in}$. More specifically, the common component extraction unit 136 calculates the red intermediate signal $R_1$ and the green intermediate signal $G_1$ using Formula (6) to Formula (8) shown below.

[Equation 6]

$$R_1 = R_{in} - W_2 \quad \text{Formula (6)}$$

$$G_1 = G_{in} - W_2 \quad \text{Formula (7)}$$

$$B_1 = B_{in} - W_2 \quad \text{Formula (8)}$$

In the second embodiment, B is equal to 0 since the signal intensity of the blue input signal $B_{in}$ is lower than those of the red input signal $R_{in}$ and the green input signal $G_{in}$.

Based on the common signal intensity component $W_2$, the visibility adjuster 137 calculates a red intermediate signal $R_3$, a green intermediate signal $G_3$, a blue intermediate signal $B_3$, and a yellow intermediate signal $Ye_3$ by taking into account the visibilities of red component light, green component light, blue component light, and yellow component light. Here, the visibility adjuster 137 calculates the red intermediate signal $R_3$, the green intermediate signal $G_3$, the blue intermediate signal $B_3$, and the yellow intermediate signal $Ye_3$ using ratios (e.g., red ratio $r_R=187/255$, green ratio $r_G=255/255$, blue ratio $r_B=128/255$, and yellow ratio $r_{Ye}=255/255$) for which the visibilities of the red component light, the green component light, the blue component light, and the yellow component light are considered. Specifically, the visibility adjuster 137 calculates the red intermediate signal $R_3$, the green intermediate signal $G_3$, the blue intermediate signal $B_3$, and the yellow intermediate signal $Ye_3$ using Formula (9) to Formula (12) shown below.

[Equation 7]

$$R_3 = W_2 \times r_R \quad \text{Formula (9)}$$

$$G_3 = W_2 \times r_G \quad \text{Formula (10)}$$

$$B_3 = W_2 \times r_B \quad \text{Formula (11)}$$

$$Y_3 = W_2 \times r_Y \quad \text{Formula (12)}$$

The above-described Ye substitution component calculator 132 calculates the Ye substitution signal W corresponding to a component (Ye substitution component) of the yellow component light which is substitutable for the red component light and the green component light. More specifically, based on the red intermediate signal $R_1$ and the green intermediate signal $G_1$, the Ye substitution component calculator 132 calculates the Ye substitution signal W using Formula (13) shown below.

[Equation 8]

$$W = \min(R_1, G_1) \quad \text{Formula (13)}$$

Incidentally, min $(R_1, G_1)$ represents an input signal having a lower signal intensity between the red intermediate signal $R_1$ and the green intermediate signal $G_1$.

Based on the red intermediate signal $R_1$, the green intermediate signal $G_1$, and the Ye substitution signal W, the above-described Ye component adjuster 134 calculates a red adjustment signal $R_2$, a green adjustment signal $G_2$, and a yellow adjustment signal $Ye_2$. Here, in the calculation of the red adjustment signal $R_2$, the green adjustment signal $G_2$, and the yellow adjustment signal $Ye_2$, the Ye component adjuster 134 uses the color reproduction parameter $\alpha$ and the luminance parameter $\beta_1$. More specifically, the Ye component adjuster 134 calculates the red adjustment signal $R_2$, the green adjustment signal $G_2$, and the yellow adjustment signal $Ye_2$ using Formula (14) to Formula (16) shown below.

[Equation 9]

$$R_2 = R_1 - W \times \alpha \quad \text{Formula (14)}$$

$$G_2 = G_1 - W \times \alpha \quad \text{Formula (15)}$$

$$Ye_2 = W \times (\alpha + \beta_1) \quad \text{Formula (16)}$$

The output unit 135 outputs the red output signal $R_{out}$, the green output signal $G_{out}$, the blue output signal $B_{out}$, and the yellow output signal $Ye_{out}$ to the respective liquid crystal panels 30. Specifically, the output unit 135 outputs a signal which is the sum of the red adjustment signal $R_2$ and the red intermediate signal $R_3$, to the liquid crystal panel 30R as the red output signal $R_{out}$. Similarly, the output unit 135 outputs a signal which is the sum of the green adjustment signal $G_2$ and the green intermediate signal $G_3$, to the liquid crystal panel 30G as the green output signal $G_{out}$, and also outputs a signal which is the sum of the yellow adjustment signal $Ye_2$ and the yellow intermediate signal $Ye_3$, to the liquid crystal panel 30Ye as the yellow output signal $Ye_{out}$. Meanwhile, the output unit 135 outputs the blue intermediate signal $B_3$ directly to the liquid crystal panel 30B as the blue output signal $B_{out}$.

(Operation of the Projection Image Display Apparatus)

Figure 8:
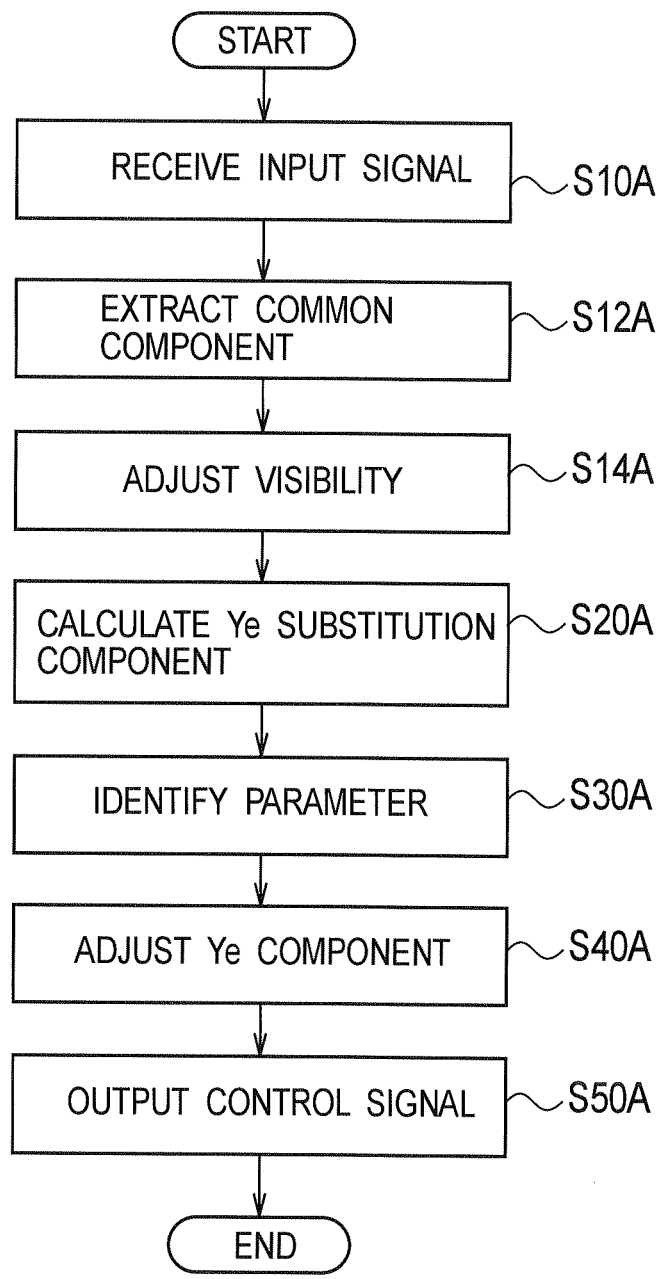
FIG. 8 is a flowchart showing operation of the projection image display apparatus 100 according to the second embodiment.

Operation of the projection image display apparatus of the second embodiment is described below with reference to a drawing. FIG. 8 is a flowchart showing operation of the projection image display apparatus 100 of the second embodiment.

As shown in FIG. 8, in Step 10A, the projection image display apparatus 100 receives the red input signal $R_{in}$, the green input signal $G_{in}$, and the blue input signal $B_{in}$.

In Step 12A, the projection image display apparatus 100 extracts the common signal intensity component $W_2$ common to the red input signal $R_{in}$, the green input signal $G_{in}$, and the blue input signal $B_{in}$. Specifically, the projection image display apparatus 100 calculates the common signal intensity component $W_2$ using Formula (5) shown below.

[Equation 10]

$$W_2 = \min(R_{in}, G_{in}, B_{in}) \quad \text{Formula (5)}$$

Incidentally, min $(R_{in}, G_{in}, B_{in})$ represents an input signal having low signal intensity among the red input signal $R_{in}$, the green input signal $G_{in}$, and the blue input signal $B_{in}$.

In Step 14A, based on the common signal intensity component $W_2$, the projection image display apparatus 100 calculates a red intermediate signal $R_3$, a green intermediate signal $G_3$, a blue intermediate signal $B_3$, and a yellow intermediate signal $Ye_3$ by taking into account the visibilities of the red component light, the green component light, the blue component light, and the yellow component light. Specifically, the projection image display apparatus 100 calculates the red intermediate signal $R_3$, the green intermediate signal $G_3$, the blue intermediate signal $B_3$, and the yellow intermediate signal $Ye_3$ using Formula (9) to Formula (12) shown below.

[Equation 11]

$$R_3 = W_2 \times r_R \quad \text{Formula (9)}$$

$$G_3 = W_2 \times r_G \quad \text{Formula (10)}$$

$$B_3 = W_2 \times r_B \quad \text{Formula (11)}$$

$$Y_3 = W_2 \times r_Y \quad \text{Formula (12)}$$

Incidentally, the red ratio $r_R$, the green ratio $r_G$, the blue ratio $r_B$, and the yellow ratio $r_{Ye}$ are ratios for which the visibilities of the red component light, the green component light, the blue component light, and the yellow component light are considered.

In Step 20A, the projection image display apparatus 100 calculates the red intermediate signal $R_1$ and the green intermediate signal $G_1$ using Formula (6) to Formula (8) shown below.

[Equation 12]

$$R_1 = R_{in} - W_2 \qquad \text{Formula (6)}$$

$$G_1 = G_{in} - W_2 \qquad \text{Formula (7)}$$

$$B_1 = B_{in} - W_2 \qquad \text{Formula (8)}$$

Subsequently, based on the red intermediate signal $R_1$ and the green intermediate signal $G_1$, the projection image display apparatus 100 calculates the Ye substitution signal W using Formula (13) shown below.

[Equation 13]

$$W = \min(R_1, G_1) \qquad \text{Formula (13)}$$

Incidentally, $\min(R_1, G_1)$ represents an input signal having a lower signal intensity between the red intermediate signal $R_1$ and the green intermediate signal $G_1$.

In Step 30A, the projection image display apparatus 100 identifies the color reproduction parameter $\alpha$ and the luminance parameter $\beta_1$ based on the saturation of an image and the luminance thereof. Specifically, the projection image display apparatus 100 identifies the luminance parameter $\beta_1$ with reference to FIGS. 5 described above.

In Step 40A, based on the red intermediate signal $R_1$, the green intermediate signal $G_1$, and the Ye substitution signal W, the projection image display apparatus 100 calculates a red adjustment signal $R_2$, a green adjustment signal $G_2$, and a yellow adjustment signal $Ye_2$. More specifically, the projection image display apparatus 100 calculates the red adjustment signal $R_2$, the green adjustment signal $G_2$, and the yellow adjustment signal $Ye_2$ using Formula (14) to Formula (16) shown below.

[Equation 14]

$$R_2 = R_1 - W \times \alpha \qquad \text{Formula (14)}$$

$$G_2 = G_1 - W \times \alpha \qquad \text{Formula (15)}$$

$$Ye_2 = W \times (\alpha + \beta_1) \qquad \text{Formula (16)}$$

In Step 50A, the projection image display apparatus 100 outputs the red output signal $R_{out}$, the green output signal $G_{out}$, the blue output signal $B_{out}$, and the yellow output signal $Ye_{out}$. Specifically, the projection image display apparatus 100 outputs a signal which is the sum of the red adjustment signal $R_2$ and the red intermediate signal $R_3$, to the liquid crystal panel 30R as the red output signal $R_{out}$. Similarly, the projection image display apparatus 100 outputs a signal which is the sum of the green adjustment signal $G_2$ and the green intermediate signal $G_3$, to the liquid crystal panel 30G as the green output signal $G_{out}$, and also outputs a signal which is the sum of the yellow adjustment signal $Ye_2$ and the yellow intermediate signal $Ye_3$, to the liquid crystal panel 30Ye as the yellow output signal $Ye_{out}$. Meanwhile, the projection image display apparatus 100 outputs the blue intermediate signal $B_3$ directly to the liquid crystal panel 30B as the blue output signal $B_{out}$.

(Calculation Examples of Output Signals)

Figure 9:
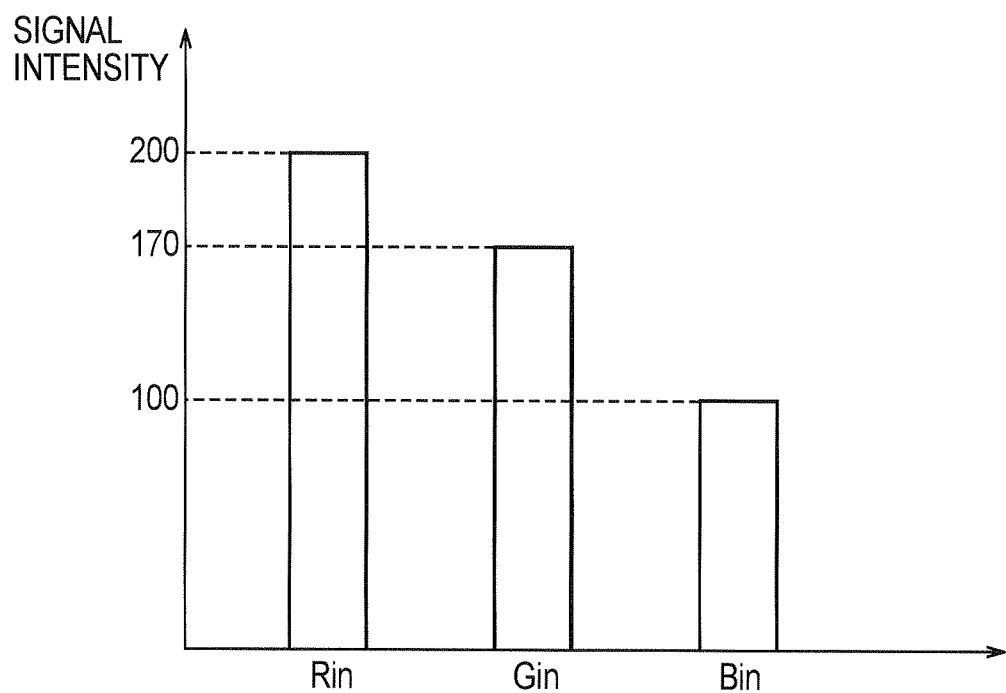
FIG. 9 is a view for explaining a calculation example of an output signal according to the second embodiment.

Referring to FIGS. 9 to 14, calculation examples of output signals of the second embodiment are described below. Specifically, description is given to the case where the red output signal $R_{out}$, the green output signal $G_{out}$, the blue output signal $B_{out}$ and the yellow output signal $Ye_{out}$ are calculated, when the red input signal $R_{in}$="200"; the green input signal $G_{in}$="170"; and the blue input signal $B_{in}$="100," as shown in FIG. 9.

Figure 10:
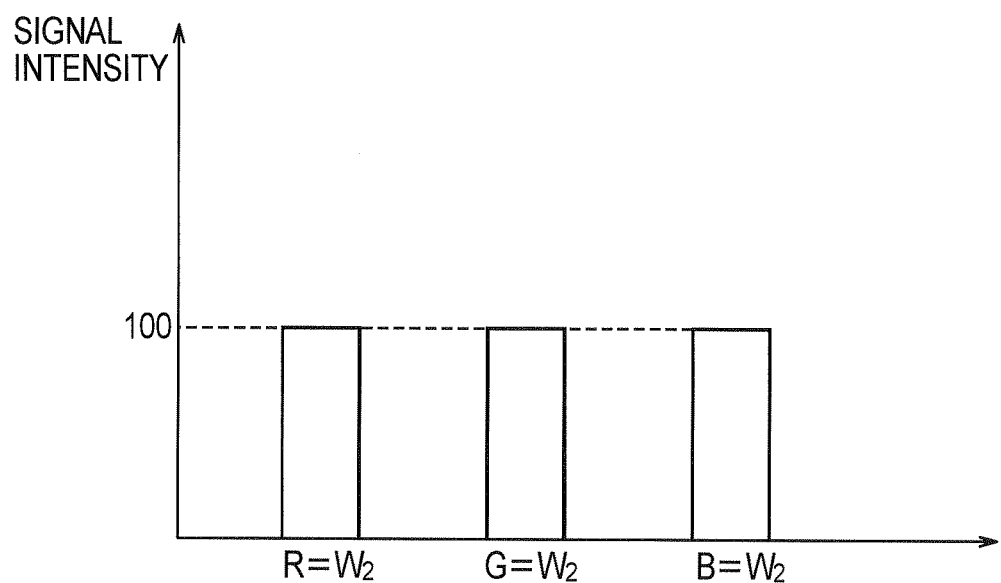
FIG. 10 is a view for explaining a calculation example of an output signal according to the second embodiment.

As shown in FIG. 10, the projection image display apparatus 100 calculates the common signal intensity component $W_2$ using Formula (5) shown below.

[Equation 15]

$$W_2 = \min(R_{in}, G_{in}, B_{in}) \qquad \text{Formula (5)}$$

Figure 11:
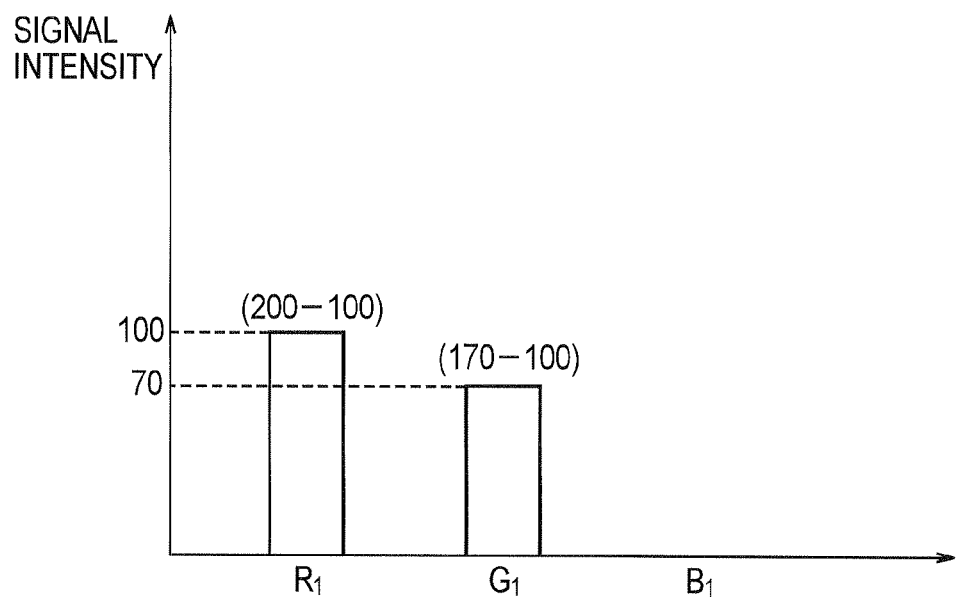
FIG. 11 is a view for explaining a calculation example of an output signal according to the second embodiment.

As shown in FIG. 11, the projection image display apparatus 100 calculates the red intermediate signal $R_1$ and the green intermediate signal $G_1$ using Formula 6) to Formula 8) shown below.

[Equation 16]

$$R_1 = R_{in} - W_2 \qquad \text{Formula (6)}$$

$$G_1 = G_{in} - W_2 \qquad \text{Formula (7)}$$

$$B_1 = B_{in} - W_2 \qquad \text{Formula (8)}$$

Figure 12:
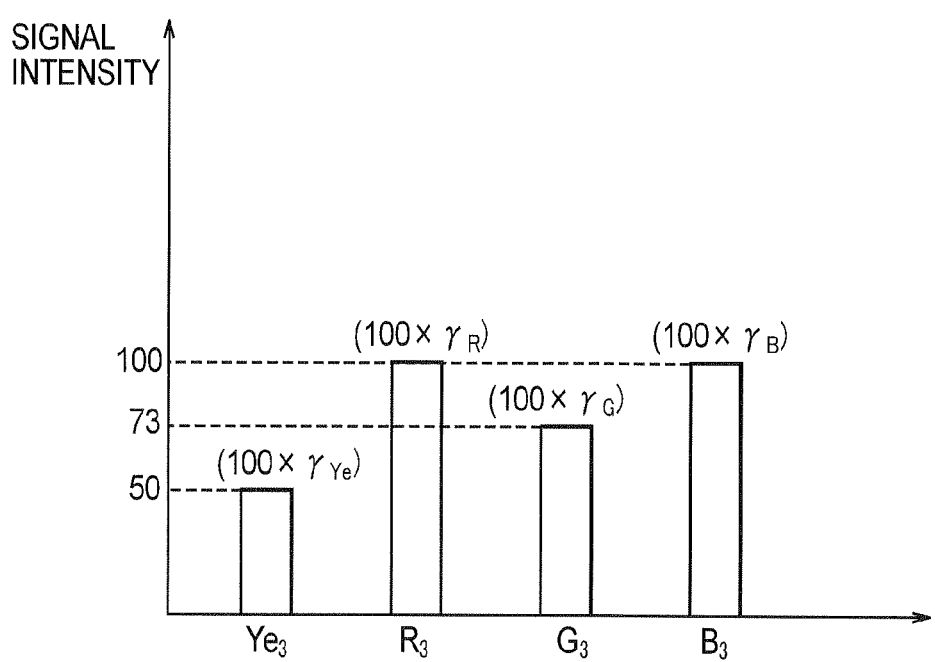
FIG. 12 is a view for explaining a calculation example of an output signal according to the second embodiment.

As shown in FIG. 12, the projection image display apparatus 100 calculates the red intermediate signal $R_3$, the green intermediate signal $G_3$, the blue intermediate signal $B_3$, and the yellow intermediate signal $Ye_3$ using Formula (9) to Formula (12) shown below.

[Equation 17]

$$R_3 = W_2 \times r_R \qquad \text{Formula (9)}$$

$$G_3 = W_2 \times r_G \qquad \text{Formula (10)}$$

$$B_3 = W_2 \times r_B \qquad \text{Formula (11)}$$

$$Y_3 = W_2 \times r_Y \qquad \text{Formula (12)}$$

Incidentally, it should be noted that FIG. 12 exemplifies the case where the red ratio $r_R$=187/255, the green ratio $r_G$=255/255, the blue ratio $r_B$=128/255, and the yellow ratio $r_{Ye}$=255/255.

Figure 13:
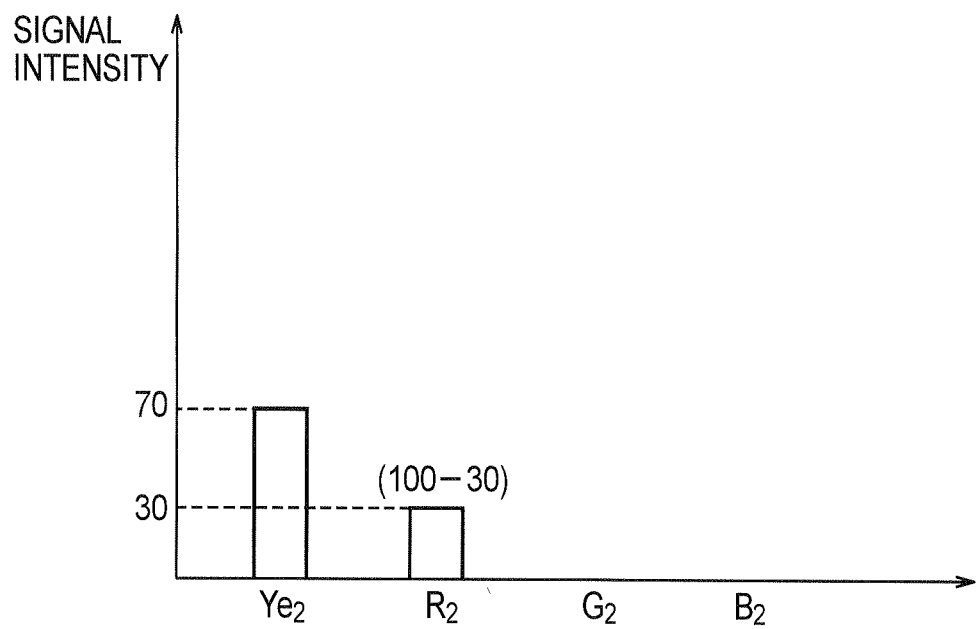
FIG. 13 is a view for explaining a calculation example of an output signal according to the second embodiment.

As shown in FIG. 13, based on the red intermediate signal $R_1$ and the green intermediate signal $G_1$, the projection image display apparatus 100 calculates the Ye substitution signal W using Formula (13) shown below.

[Equation 18]

$$W = \min(R_1, G_1) \qquad \text{Formula (13)}$$

Subsequently, the projection image display apparatus 100 calculates the red adjustment signal $R_2$, the green adjustment signal $G_2$, and the yellow adjustment signal $Ye_2$ using Formula (14) to Formula (16) shown below.

[Equation 19]

$$R_2 = R_1 - W \times \alpha \qquad \text{Formula (14)}$$

$$G_2 = G_1 - W \times \alpha \qquad \text{Formula (15)}$$

$$Ye_2 = W \times (\alpha + \beta_1) \qquad \text{Formula (16)}$$

Incidentally, it should be noted that FIG. 13 exemplifies the case where "1" is identified as the color reproduction parameter $\alpha$ and "0" is identified as the luminance parameter $\beta_1$.

Figure 14:
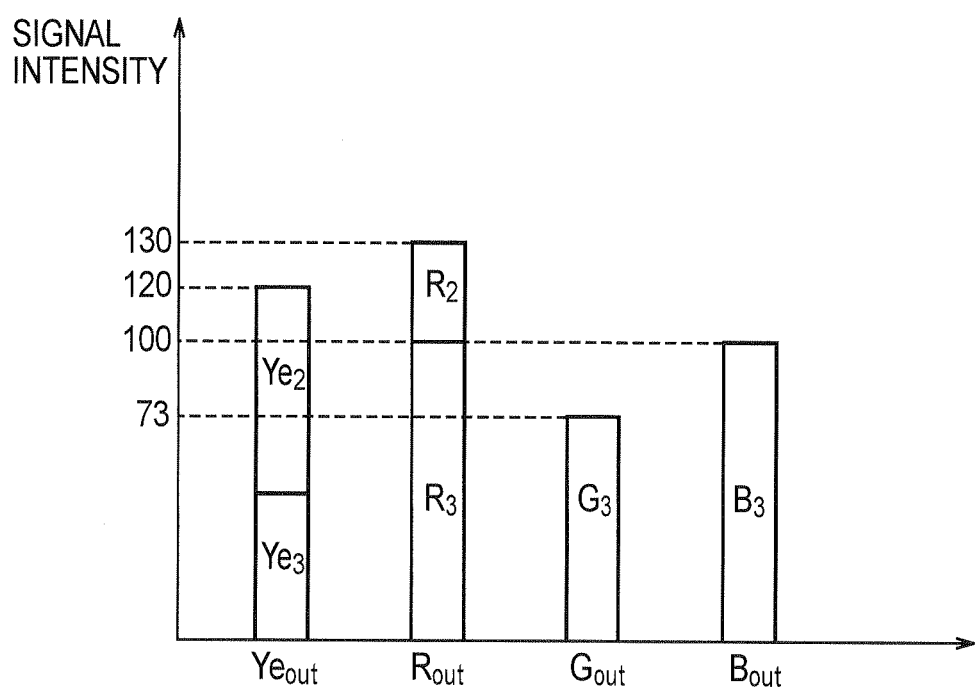
FIG. 14 is a view for explaining a calculation example of an output signal according to the second embodiment.

As shown in FIG. 14, the projection image display apparatus 100 outputs a signal which is the sum of the red adjustment signal $R_2$ and the red intermediate signal $R_3$, to the liquid crystal panel 30R as the red output signal $R_{out}$. Similarly, the projection image display apparatus 100 outputs a signal which is the sum of the green adjustment signal $G_2$ and the green intermediate signal $G_3$, to the liquid crystal panel 30G as the green output signal $G_{out}$, and also outputs a signal which is the sum of the yellow adjustment signal $Ye_2$ and the yellow intermediate signal $Ye_3$, to the liquid crystal panel 30Ye as the yellow output signal $Ye_{out}$. Meanwhile, the projection image display apparatus 100 outputs the blue intermediate signal $R_3$ directly to the liquid crystal panel 30B as the blue output signal $B_{out}$.

(Operation and Effect)

In accordance with the projection image display apparatus 100 of the second embodiment, the controlling unit 130 extracts the common signal intensity component $W_2$ common to the red input signal $R_{in}$, the green input signal $G_{in}$, and the blue input signal $B_{in}$. Thereafter, the controlling unit 130 calculates the red intermediate signal $R_3$, the green intermediate signal $G_3$, the blue intermediate signal $B_3$, and the yellow intermediate signal $Ye_3$ by multiplying the common signal intensity component $W_2$ by each of the ratios for which the visibilities have been considered.

Further, the controlling unit 130 calculates the red adjustment signal $R_2$, the green adjustment signal $G_2$, and the yellow adjustment signal $Ye_2$, based on the red intermediate signal $R_1$ and the green intermediate signal $G_1$ which is obtained by excluding the common signal intensity component $W_2$ from the red input signal $R_{in}$ and the green input signal $G_{in}$.

Further, the red output signal $R_{out}$ is a signal which is the sum of the red adjustment signal $R_2$ and the red intermediate signal $R_3$, the green output signal $G_{out}$ is a signal which is the sum of the green adjustment signal $G_2$ and the green intermediate signal $G_3$, and the yellow output signal $Ye_{out}$ is a signal which is the sum of the yellow adjustment signal $Ye_2$ and the yellow intermediate signal $Ye_3$.

Accordingly, by excluding the common signal intensity component $W_2$ from the red input signal $R_{in}$ and the green input signal $G_{in}$, the deterioration of color reproducibility of an image caused by the use of the yellow component light can be controlled.

[Third Embodiment]

A third embodiment is described below with reference to drawings. Differences between the first embodiment and the third embodiment are mainly described below.

More specifically, in the above-described first embodiment, a superimposition amount of the yellow component light (Ye substitution signal W) is determined from an input signal having a lower intensity between the red input signal $R_{in}$ and the green input signal $G_{in}$.

In contrast, in the third embodiment, a superimposition amount of yellow component light (Ye substitution signal W) is determined from a mean value of luminance of respective pixels included in a target region and a mean value of saturation thereof.

(Function of the Projection Image Display Apparatus)

Figure 15:
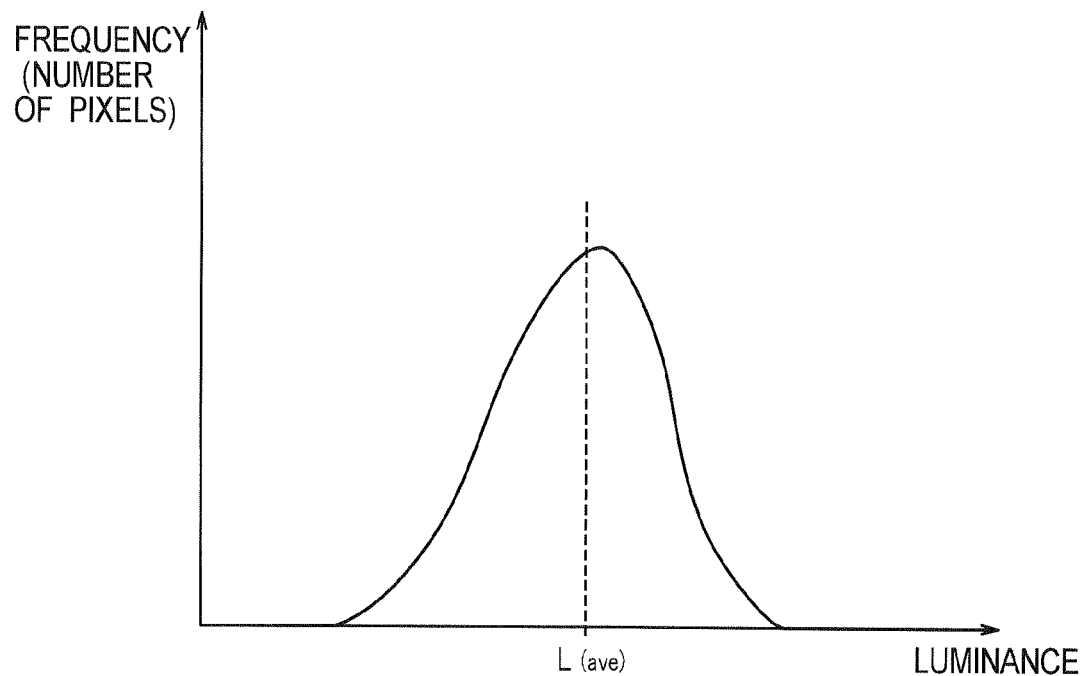
FIG. 15 is a view for explaining a function of a lighting unit 120 according to a third embodiment.

A function of a projection image display apparatus 100 of the third embodiment is described below with reference to the drawings. FIG. 15 is a view for explaining the functions of the projection image display apparatus 100 (controlling unit 130) of the third embodiment.

The projection image display apparatus 100 (controlling unit 130) calculates the superimposition amount of the yellow component light (Ye substitution signal W) for each target region determined according to the resolution of the liquid crystal panel 30Ye.

As shown in FIG. 15, the controlling unit 130 creates a histogram of pixels included in the target region corresponding to the luminance of the each of the pixels. Subsequently, the controlling unit 130 calculates a luminance average value $(L_{(ave)})$ of the pixels included in the target region.

The controlling unit 130 calculates the red output signal $R_{out}$, the green output signal $G_{out}$, the blue output signal $B_{out}$, and the yellow output signal $Ye_{out}$ using Formula (21) to Formula (24).

[Equation 20]

$$B_{out}=B_{in} \quad \text{Formula (21)}$$

$$R_{out}=R_{in}-Ye_{out} \quad \text{Formula (22)}$$

$$G_{out}=G_{in}-Ye_{out} \quad \text{Formula (23)}$$

$$Ye_{out}=L_{(ave)} \quad \text{Formula (24)}$$

However, when the luminance average value $(L_{(ave)})$ exceeds min $(R_{in}, G_{in})$, min $(R_{in}, G_{in})$ may be used instead of the luminance average value $(L_{(ave)})$.

Incidentally, it should be noted that the yellow output signal $Ye_{out}$ is the same as the Ye substitution signal W in the third embodiment.

[Variation 1 of the Third Embodiment]

A variation 1 of the third embodiment is described below with reference to the drawing. Specifically, in the variation 1 of the third embodiment, a saturation average value $(C_{(ave)})$ is used instead of the luminance average value $(L_{(ave)})$.

(Function of the Projection Image Display Apparatus)

Figure 16:
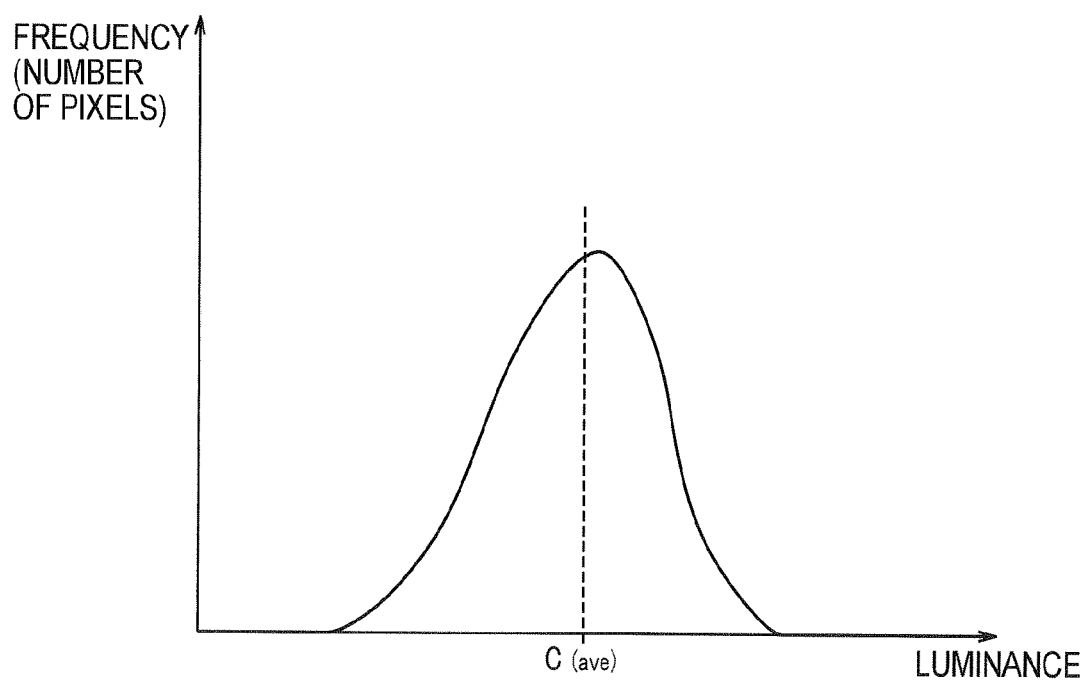
FIG. 16 is a view for explaining a function of the lighting unit 120 of a first variation according to the third embodiment.

A function of the projection image display apparatus of the variation 1 of the third embodiment is described below with reference to the drawing. FIG. 16 is a view for explaining the function of the projection image display apparatus 100 (controlling unit 130) of the variation 1 of the third embodiment.

As shown in FIG. 16, the controlling unit 130 creates a histogram, of the pixels included in a target region corresponding to the saturation of each of the pixels. Subsequently, the controlling unit 130 calculates the saturation average value $(C_{(ave)})$ of the pixels included in the target region.

The controlling unit 130 calculates the red output signal $R_{out}$, the green output signal $G_{out}$, the blue output signal $B_{out}$, and the yellow output signal $Ye_{out}$ using Formula (25) to Formula (28).

[Equation 21]

$$B_{out}=B_{in} \quad \text{Formula (25)}$$

$$R_{out}=R_{in}-Ye_{out} \quad \text{Formula (26)}$$

$$G_{out}=G_{in}-Ye_{out} \quad \text{Formula (27)}$$

$$Ye_{out}=C_{(ave)} \quad \text{Formula (28)}$$

However, when the saturation average value $(C_{(ave)})$ exceeds min $(R_{in}, G_{in})$, min $(R_{in}, G_{in})$ may be used instead of the saturation average value $(C_{(ave)})$.

[Variation 2 of the Third Embodiment]

A variation 2 of the third embodiment is described below with reference to the drawing. Specifically, in the variation 2 of the third embodiment, luminance average values $(L_{1(ave)}, L_{2(ave)})$ calculated for each hue is used instead of the luminance average value $(L_{(ave)})$.

(Function of the Projection Image Display Apparatus)

Figure 17A:
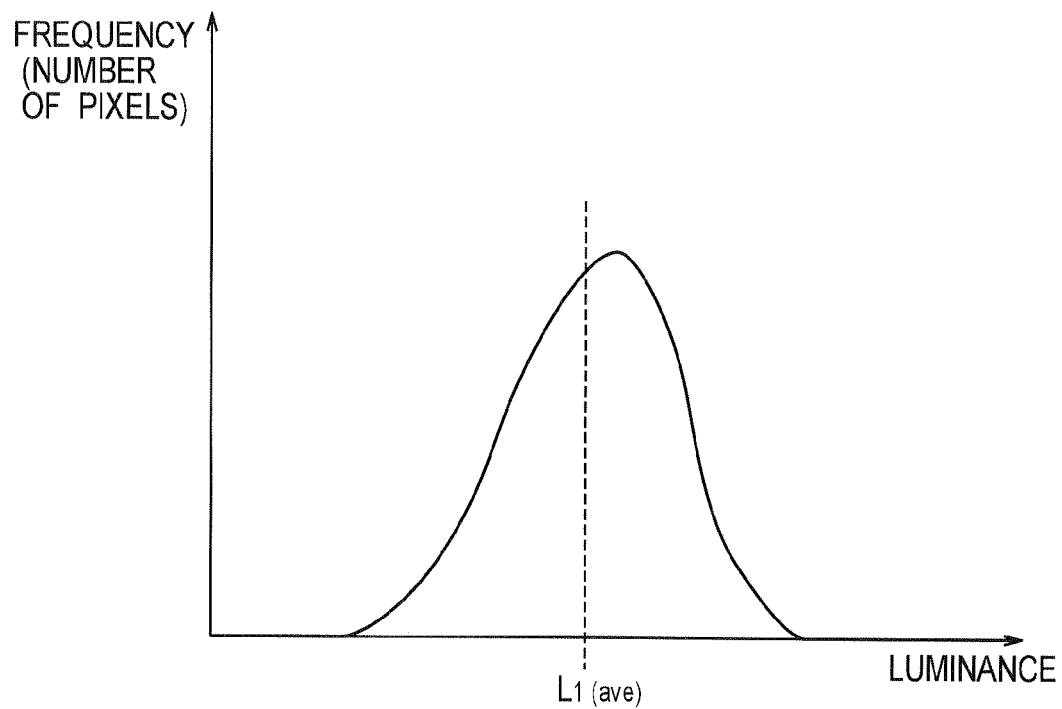
FIGS. 17A and 17B are views for explaining a function of the lighting unit 120 of a second variation according to the third embodiment.
Figure 17B:
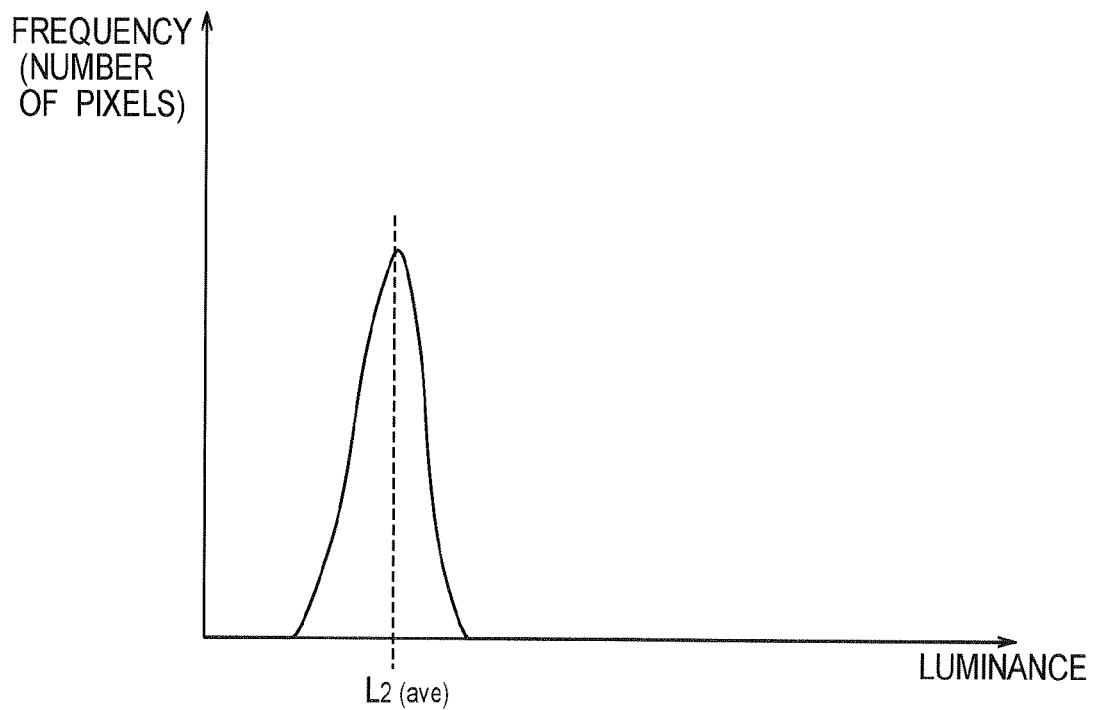

A function of the projection image display apparatus of the variation 2 of the third embodiment is described below with reference to the drawings. FIGS. 17A and 17B are views for explaining the function of the projection image display apparatus 100 (controlling unit 130) of the variation 2 of the third embodiment.

As shown in FIGS. 17A and 17B, the controlling unit 130 creates a histogram of the pixels included in a target region corresponding to the luminance of each of the pixels, for the each of hues $(\theta_1, \theta_2)$. Subsequently, the controlling unit 130 calculates luminance average value ($L_{1(ave)}$, $L_{2(ave)}$) for each of the hues ($\theta_1$, $\theta_2$) of the pixels included in the target region.

Here, the hue ($\theta_1$) represents a hue (e.g., red) which is largely effected by the yellow component light when the color is reproduced in the target region. The hue ($\theta_2$) represents a hue (e.g., cyan) which is less effected by yellow component when the color is reproduced in the target region.

The controlling unit 130 calculates the red output signal $R_{out}$, the green output signal $G_{out}$, the blue output signal $B_{out}$, and the yellow output signal $Ye_{out}$ using Formula (29) to Formula (32).

[Equation 22]

$$B_{out} = B_{in} \quad \text{Formula (29)}$$

$$R_{out} = R_{in} - Ye_{out} \quad \text{Formula (30)}$$

$$G_{out} = G_{in} - Ye_{out} \quad \text{Formula (31)}$$

$$Ye_{out} = p \times L_{1(ave)} + q \times L_{2(ave)} \quad \text{Formula (32)}$$

However, when "$p \times L_{1(ave)} + q \times L_{2(ave)}$" exceeds min ($R_{in}$, $G_{in}$), min ($R_{in}$, $G_{in}$) may be used instead of "$p \times L_{1(ave)} + q \times L_{2(ave)}$." Further, the coefficients p and q may be set so that "$p \times L_{1(ave)} + q \times L_{2(ave)}$" does not exceed min ($R_1$, $G_1$).

Incidentally, the coefficients p and q are adjustment coefficients set for each of the hues and have a relationship of "$p<q$." Thus, checked is an increase of a superimposition amount of the yellow component light calculated based on the hue ($\theta_1$) which largely influences the color reproducibility of the target region.

[Variation 3 of the Third Embodiment]

A variation 3 of the third embodiment is described below with reference to the drawings. Specifically, in the variation 3 of the third embodiment, the saturation average value ($C_{(ave)}$) is used in addition to the luminance average ($L_{(ave)}$).

(Function of the Projection Image Display Apparatus)

Figure 18A:
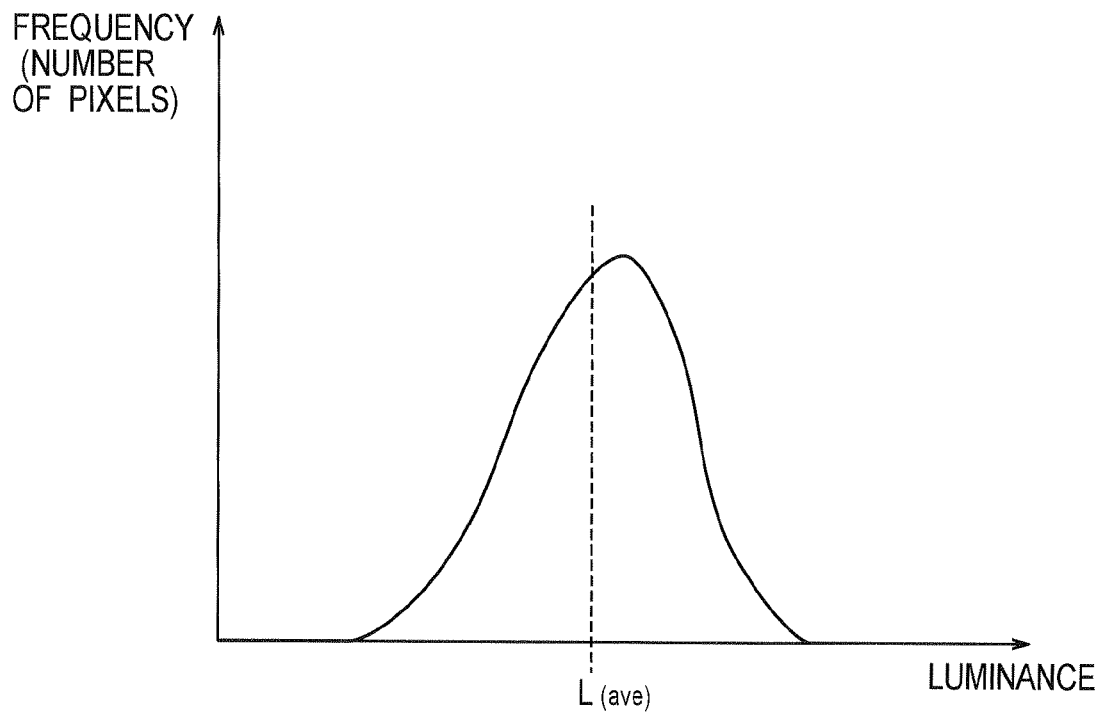
FIGS. 18A and 18B are views for explaining a function of the lighting unit 120 of a third variation according to the third embodiment.
Figure 18B:
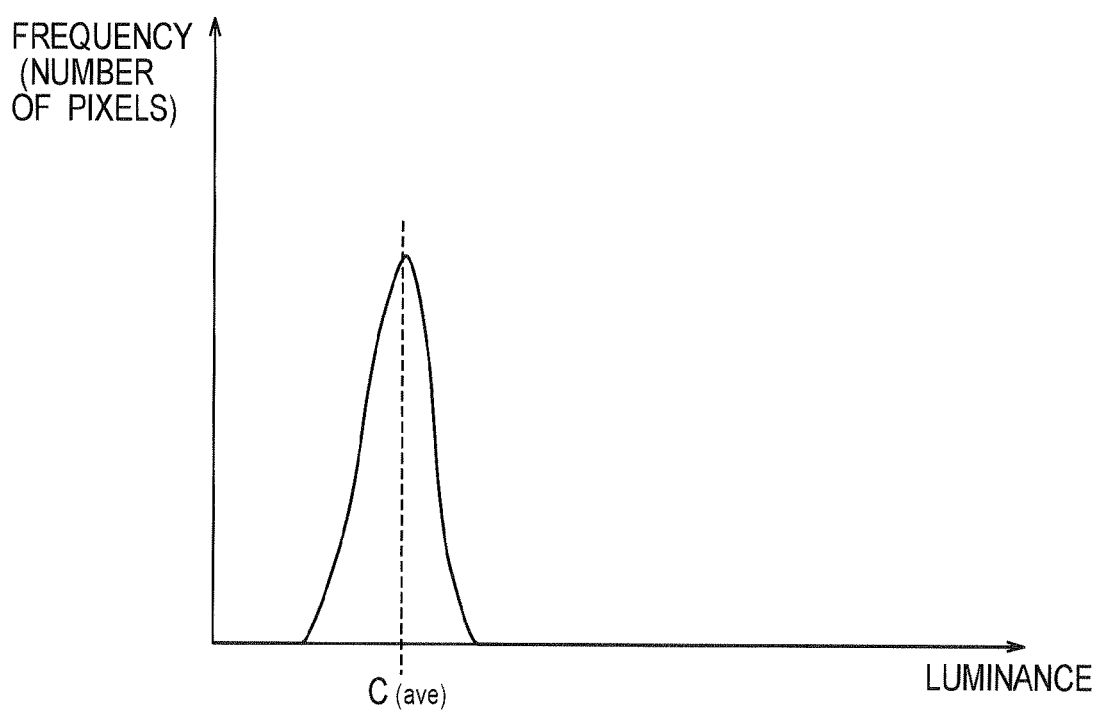

A function of the projection image display apparatus of the variation 3 of the third embodiment is described below with reference to the drawings. FIGS. 18A and 18B are views for explaining the function of the projection image display apparatus 100 (controlling unit 130) of the variation 3 of the third embodiment.

As shown in FIGS. 18A and 18B, the controlling unit 130 creates histograms of the pixels included in a target region corresponding to the luminance and saturation of each of the pixels, respectively. Subsequently, the controlling unit 130 calculates the luminance average ($L_{(ave)}$) and the saturation average value ($C_{(ave)}$) of the pixels included in the target region.

The controlling unit 130 calculates the red output signal $R_{out}$, the green output signal $G_{out}$, the blue output signal $B_{out}$, and the yellow output signal $Ye_{out}$ using Formula (33) to Formula (36).

[Equation 23]

$$B_{out} = B_{in} \quad \text{Formula (33)}$$

$$R_{out} = R_{in} - Ye_{out} \quad \text{Formula (34)}$$

$$G_{out} = G_{in} - Ye_{out} \quad \text{Formula (35)}$$

$$Ye_{out} = r \times L_{(ave)} + s \times C_{(ave)} \quad \text{Formula (32)}$$

However, when "$r \times L_{(ave)} + s \times C_{(ave)}$" exceeds min ($R_{in}$, $G_{in}$), min ($R_{in}$, $G_{in}$) may be used instead of "$r \times L_{(ave)} + s \times C_{(ave)}$." Further, the coefficients r and s may be set so that "$r \times L_{(ave)} + s \times C_{(ave)}$" does not exceed min ($R_{in}$, $G_{in}$).

In addition, different values are set for the coefficients r and s when greater importance is placed on luminance and when greater importance is placed on color reproducibility. Specifically, when greater importance is placed on luminance, the coefficients r and s have the relationship of "$r>s$." Meanwhile, in the case where greater importance is placed on color reproducibility, the coefficients r and s have the relationship of "$r<s$."

[Other Embodiments]

The present invention has been described according to the above-mentioned embodiments. But it should be understood that the description and the drawings constituting a part of this disclosure dose not limit the present invention. It is apparent to the skilled person that various alternatives, modifications, and the practices can be achieved based on this disclosure.

For example, the projection image display apparatus 100 may use cyan component light Cy as the fourth component light. In this case, a cyan output signal $Cy_{out}$ is generated based on a green input signal $G_{in}$ and a blue input signal $B_{in}$ which include colors (green G and blue B) having hues adjacent to a hue corresponding to the cyan component light Cy, among a red input signal $R_{in}$, the green input signal $G_{in}$, and the blue input signal $B_{in}$.

Similarly, the projection image display apparatus 100 may use magenta component light M as the fourth component light. In this case, a magenta output signal $M_{out}$ is generated based on a red input signal $R_{in}$ and a blue input signal $B_{in}$ which include colors (red R and blue B) having hues adjacent to a hue corresponding to the magenta component light M, among the red input signal $R_{in}$, a green input signal $G_{in}$, and the blue input signal $B_{in}$.

In the above-described embodiments, the yellow output signal $Ye_{out}$ is generated using the color reproduction parameter $\alpha$ and the luminance parameter $\beta_1$, but it is not limited to using these parameters. Specifically, the yellow output signal $Ye_{out}$ may be generated using only the color reproduction parameter $\alpha$ or using only the luminance parameter $\beta_1$. Alternatively, the yellow output signal $Ye_{out}$ may be generated using the luminance parameter $\beta_2$. Alternatively, the yellow output signal $Ye_{out}$ may be generated using the luminance parameter $\beta_1$ and the luminance parameter $\beta_2$. In addition, the color reproduction parameter $\alpha$, the luminance parameter $\beta_1$, and the luminance parameter $\beta_2$ may be properly combined to generate the yellow output signal $Ye_{out}$.

In the above-described embodiments, the controlling unit 130 is provided in the projection image display apparatus 100, but it is not limited to this. Specifically, the controlling unit 130 may be independently provided.

In the above-described embodiments, the image display apparatus has been exemplified in the projection image display apparatus 100, but it is not limited to this. The image display apparatus may be any apparatus which is capable of displaying images.

In the third embodiment described above, the superimposition amount of the yellow component light (yellow output signal $Ye_{out}$) is calculated by using the luminance average value ($L_{(ave)}$) and the saturation average value ($C_{(ave)}$), but it is not limited to this. Specifically, the superimposition amount of yellow component light (yellow output signal $Ye_{out}$) may be calculated by using representative values of luminance and saturation such as a minimum value ($L_{(min)}$) of luminance, a maximum value ($L_{(max)}$) of luminance, a minimum value ($C_{(min)}$) of saturation, and a maximum value ($C_{(max)}$) of saturation.

In the above-described embodiments, the relationship that is represented by "Ye=R+G" is assumed to hold, but it is not limited to this. Even when relationships such as "Ye=R+2G" and "Ye=2R+G" hold, it is possible to calculate a superimposition amount of yellow component light (yellow output signal Ye$_{out}$) by adjusting the respective formulas described above.

In the above-described embodiments, the yellow component light emitting from the liquid crystal panel 30Ye is superimposed on the red component light, but it is not limited to this. Yellow component light emitting from the liquid crystal panel 30Ye may be superimposed on component light of different color (green component light or blue component light).

In the above-described embodiments, the yellow component light is separated from the light emitted from the light source 10, but it is not limited to this. Specifically, the projection image display apparatus 100 may be provided with a solid light source (a laser diode (LD) or a light emitting diode (LED)) which emits yellow component light.

In the above-described embodiments, the superimposition amount of the yellow component light is controlled by the modulation amount of the liquid crystal panel 30Ye, but it is not limited to this. Specifically, the superimposition amount of yellow component light may be controlled by an iris mechanism which is provided on a light path of the yellow component light.

In the above-described embodiments, the light imager has been exemplified in the liquid crystal panel, but it is not limited to this. Specifically, the light modulator may be a Liquid Crystal on Silicon (LCOS) or a Digital Micromirror Device (DMD).

What is claimed is:

1. An image signal converting apparatus used in a lighting apparatus that includes
    a red-light imager modulating a red component light according to a red image signal,
    a green-light imager modulating a green component light according to a green image signal, and
    a blue-light imager modulating a blue component light according to a blue image signal,
    in the lighting apparatus, a fourth color component light being simultaneously superimposed on any of the red component light, the green component light, and the blue component light, by a controlling unit, wherein
    the controlling unit configured to control a superimposition amount of the fourth color component light based on a specific image signal having lower signal strength among two specific image signals corresponds to specific color component lights having hues adjacent to a hue corresponding to the fourth color component light, a color reproduction parameter determined so that the light amount of the fourth color component light increases along with an increase in saturation of an image and a luminance parameter determined so that the light amount of the fourth color component light decreases along with an increase in saturation of an image, wherein
    the controlling unit controls a reduction amount of the two specific image signals based on the superimposition amount.

2. The image signal converting apparatus according to claim 1, wherein
    the luminance parameter determined so that the light amount of the fourth color component light increases until the luminance of an image reaches a predetermined threshold value, and that the light amount of the fourth color component light decreases after the luminance of the image exceeds the predetermined threshold value.

3. An image display apparatus that includes
    a red-light imager modulating a red component light according to a red image signal,
    a green-light imager modulating a green component light according to a green image signal, and
    a blue-light imager modulating a blue component light according to a blue image signal, and
    a color combining unit configured to combine the red component light emitting from the red light imager, the green component light emitting from the green light imager, and blue component light emitting from the blue light imager;
    in the image display apparatus, a fourth color component light being simultaneously superimposed on any of the red component light, the green component light, and the blue component light by a controlling unit, wherein
    the controlling unit configured to control a superimposition amount of the fourth color component light based on a specific image signal having lower signal strength among two specific image signals corresponds to specific color component lights having hues adjacent to a hue corresponding to the fourth color component light, a color reproduction parameter determined so that the light amount of the fourth color component light increases along with an increase in saturation of an image, and a luminance parameter determined so that the light amount of the fourth color component light decreases along with an increase in saturation of an image, wherein
    the controlling unit controls a reduction amount of the two specific image signals based on the superimposition amount.

\* \* \* \* \*